US012723148B2

(12) United States Patent
Fereydoon et al.

(10) Patent No.: US 12,723,148 B2
(45) **Date of Patent: *Sep. 1, 2026**

(54) POLYETHYLENE COMPOSITION FOR BIAXIAL ORIENTATION

(71) Applicant: NOVA Chemicals (International) S.A., Fribourg (CH)

(72) Inventors: Maryam Fereydoon, Calgary (CA); Shivendra Goyal, Calgary (CA); Sepideh Kasiri, Calgary (CA); Owen Lightbody, Calgary (CA); Norman Aubee, Okotoks (CA); Bronwyn Gillon, Calgary (CA)

(73) Assignee: NOVA Chemicals (International) S.A., Fribourg (CH)

( * ) Notice: Subject to any disclaimer, the term of this patent is extended or adjusted under 35 U.S.C. 154(b) by 367 days.

This patent is subject to a terminal disclaimer.

(21) Appl. No.: 18/550,421

(22) PCT Filed: Mar. 16, 2022

(86) PCT No.: PCT/IB2022/052396

§ 371 (c)(1),
(2) Date: Sep. 13, 2023

(87) PCT Pub. No.: WO2022/195512

PCT Pub. Date: Sep. 22, 2022

(65) Prior Publication Data

US 2024/0301184 A1 Sep. 12, 2024

Related U.S. Application Data

(60) Provisional application No. 63/163,113, filed on Mar. 19, 2021.

(51) Int. Cl.

| | |
|---|---|
| ***C08L 23/0807*** | (2025.01) |
| ***B29C 55/12*** | (2006.01) |
| ***B29K 23/00*** | (2006.01) |

(52) U.S. Cl.

CPC .......... *C08L 23/0815* (2013.01); *B29C 55/12* (2013.01); *B29K 2023/08* (2013.01); *B29K 2995/0088* (2013.01); *C08L 2203/16* (2013.01); *C08L 2205/025* (2013.01); *C08L 2207/07* (2013.01); *C08L 2314/02* (2013.01); *C08L 2314/06* (2013.01)

(58) Field of Classification Search

CPC ... B29C 48/022; B29C 48/0018; B29C 48/08; B29C 48/21; B29C 55/143; B32B 7/027; B32B 27/08; B32B 27/32; B32B 2250/242; B32B 2270/00; B32B 2307/30; B32B 2307/518; B32B 2307/54; B32B 2307/72; B32B 2307/7376; B32B 2307/514; B32B 27/30; B29K 2023/0608; B29K 2105/0085; B29K 2105/0094; B29K 2995/0053; B29K 2995/0063; C08L 23/04; C08J 2323/04; C08F 210/16; C08F 2500/09; C08F 2500/10; C08F 2500/12; C08F 2500/04

See application file for complete search history.

(56) References Cited

U.S. PATENT DOCUMENTS

| | | | |
|---|---|---|---|
| 3,663,662 | A | 5/1972 | Golike et al. |
| 4,590,020 | A | 5/1986 | Itaba et al. |
| 4,870,122 | A | 9/1989 | Lu |
| 4,916,025 | A | 4/1990 | Lu |
| 5,043,204 | A | 8/1991 | Itaba et al. |
| 5,241,030 | A | 8/1993 | Barry et al. |
| 5,342,868 | A | 8/1994 | Kimura et al. |
| 5,376,439 | A | 12/1994 | Hodgson et al. |
| 5,589,561 | A | 12/1996 | Barry et al. |
| 5,725,962 | A | 3/1998 | Bader et al. |
| 5,885,721 | A | 3/1999 | Su et al. |
| 5,891,555 | A | 4/1999 | O'Brien |
| 5,981,636 | A | 11/1999 | Amos et al. |
| 6,168,826 | B1 | 1/2001 | Su et al. |
| 6,303,233 | B1 | 10/2001 | Amon et al. |
| 6,372,864 | B1 | 4/2002 | Brown |

(Continued)

FOREIGN PATENT DOCUMENTS

| | | |
|---|---|---|
| CN | 106633320 A | 5/2017 |
| CN | 106674701 A | 5/2017 |

(Continued)

OTHER PUBLICATIONS

ASTM D1003-13—Standard Test Method for Haze and Luminous Transmittance of Transparent Plastics—Copyright ASTM International—Current edition approved Nov. 15, 2013. Published Nov. 2013. Originally approved in 1949. Last previous edition approved in 2011 as D1003-11; pp. 1-7.

ASTM D1238-13—Standard Test Method for Melt Flow Rates of Thermoplastics by Extrusion Plastometer—Copyright ASTM International—Current edition approved Aug. 1, 2013. Published Aug. 2013. Originally approved in 1965. Last previous edition approved in 2010 as D1238-10 (pp. 1-16).

ASTM D1525-07—Standard Test Method for Vicat Softening Temperature of Plastics—Copyright ASTM International—Current edition approved Mar. 1, 2007. Published Mar. 2007. Originally approved in 1958. Last previous edition approved in 2006 as D1525-06 (pp. 1-9).

(Continued)

*Primary Examiner* — Blaine Copenheaver

(74) *Attorney, Agent, or Firm* — Thomas J. Styslinger

(57) ABSTRACT

A polyethylene composition has a density of from 0.941 to 0.962 g/cm$^3$; a melt index, $I_2$ of from 0.5 to 5.0 g/10 min; a melt flow ratio, $I_{21}/I_2$ of ≥40; a Z-average molecular weight distribution, Mz/Mw of ≥2.5; a comonomer distribution breadth index, $CDBI_{50}$ of >50 wt %; and a long chain branching factor, LCBF of >0.0010. In a temperature rising elution fractionation (CTREF) analysis, the polyethylene composition has greater than 70 weight percent of material eluting at a temperature of greater than 90° C.

28 Claims, 7 Drawing Sheets

(56) References Cited

U.S. PATENT DOCUMENTS 6,387,529 B1 5/2002 Peet
6,465,551 B1 10/2002 Zhao et al.
6,479,137 B1 11/2002 Joyner et al.
6,599,971 B2 7/2003 Dotson et al.
6,689,857 B1 2/2004 Larter et al.
6,764,751 B2 7/2004 Poirier
6,777,509 B2 8/2004 Brown et al.
6,946,203 B1 9/2005 Lockhart et al.
8,022,143 B2 9/2011 Wang
8,080,294 B2 12/2011 Lu
8,962,755 B2 2/2015 Wang et al.
9,074,082 B2 7/2015 Wang et al.
9,181,422 B2 11/2015 Bellehumeur et al.
9,221,966 B2 12/2015 Wang et al.
9,321,865 B2 4/2016 Bellehumeur et al.
9,475,927 B2 10/2016 Wang et al.
9,540,505 B2 1/2017 Bellehumeur et al.
9,637,628 B2 5/2017 Wang
9,676,169 B2 6/2017 Paulino
9,695,309 B2 7/2017 Bellehumeur et al.
9,724,901 B2 8/2017 Lu
9,758,653 B2 9/2017 Wang et al.
10,040,261 B2 8/2018 Mcleod et al.
10,053,564 B2 8/2018 Wang et al.
10,329,412 B2 6/2019 Wang et al.
10,363,700 B2 7/2019 Yun et al.
10,442,920 B2 10/2019 Zhang et al.
10,442,921 B2 10/2019 Zhang et al.
10,519,304 B2 12/2019 Wang
10,792,899 B2 10/2020 Pan et al.
2013/0209756 A1 8/2013 Squier et al.
2015/0259519 A1* 9/2015 Wang ..................... B65D 43/16 215/316
2015/0284523 A1* 10/2015 Kapur ........................ C08J 5/18 526/348.5
2016/0031191 A1 2/2016 Paulino
2016/0229964 A1 8/2016 Bellehumeur et al.
2017/0267822 A1 9/2017 Bellehumeur et al.
2018/0305531 A1 10/2018 Zhang et al.
2020/0017670 A1* 1/2020 Wang ...................... C08L 23/06
2020/0061982 A1 2/2020 Ambroise
2020/0224012 A1* 7/2020 Wang ..................... C08K 5/092
2020/0369014 A1 11/2020 Ambroise
2021/0032450 A1* 2/2021 Konaganti .............. C08F 4/022
2024/0182611 A1* 6/2024 Aubee ..................... B32B 27/20
2024/0367360 A1* 11/2024 Fereydoon .............. B32B 27/30

FOREIGN PATENT DOCUMENTS

CN 111662498 A 9/2020
EP 3 335 874 A1 6/2018
WO WO-97/22470 A1 6/1997
WO WO-2011/050042 A1 4/2011
WO WO-2015/042561 A1 3/2015
WO WO-2015/042562 A1 3/2015
WO WO-2015/042563 A1 3/2015
WO WO-2021/014244 A1 1/2021
WO WO-2021/119155 A1 6/2021

OTHER PUBLICATIONS

ASTM D1922-09—Standard Test Method for Propagation Tear Resistance of Plastic Film and Thin Sheeting by Pendulum Method—Copyright ASTM International—Current edition approved May 1, 2009. Published Jun. 2009. Originally approved in 1961. Last previous edition approved in 2008 as D1922-08; 7 pages.

ASTM D2457-13—Standard Test Method for Specular Gloss of Plastic Films and Solid Plastics—Copyright ASTM International—Current edition approved Apr. 1, 2013. Published Apr. 2013. Originally approved in 1965. Last previous edition approved in 2008 as D2457-08 (pp. 1-6).

ASTM D3124-98—Standard Test Method for Vinylidene Unsaturation in Polyethylene by Infrared Spectrophotometry—Copyright ASTM International—Current edition approved Mar. 10, 1998. Published Dec. 1998. Originally published as D3124-72. Last previous edition D3124-93 (pp. 1-4).

ASTM D3418-12—Standard Test Method for Transition Temperatures and Enthalpies of Fusion and Crystallization of Polymers by Differential Scanning Calorimetry—Current edition approved Aug. 1, 2012. Published Sep. 2012. Originally approved in 1975. Last previous edition approved in 2008 as D3418-08 (pp. 1-7).

ASTM D4703-16—Standard Practice for Compression Molding Thermoplastic Materials into Test Specimens, Plaques, or Sheets—Copyright ASTM International—Current edition approved Apr. 1, 2016. Published Apr. 2016. Originally approved in 1991. Last previous edition approved in 2010 as D4703-10a. (pp. 1-13).

ASTM D5748-95—Standard Test Method for Protrusion Puncture Resistance of Stretch Wrap Film—Copyright ASTM International—Current edition approved Jul. 15, 1995. Published Sep. 1995 (pp. 1-4).

ASTM D6248-98—Standard Test Methods for Vinyl and Trans Unsaturation in Polyethylene by Infrared Spectrophotometry—Copyright ASTM International—Current edition approved May 1, 2012. Published Jul. 2012. Originally approved in 1998. Last previous edition approved in 2004 as D6248-98 (pp. 1-3).

ASTM D6474-12—Standard Test Method for Determining Molecular Weight Distribution and Molecular Weight Averages of Polyolefins by High Temperature Gel Permeation Chromatography—Copyright ASTM International—Current edition approved Dec. 15, 2012. Published Dec. 2012. Originally approved in 1999. Last previous edition approved in 2006 as D6474-99. (pp. 1-6).

ASTM D6474-99—Standard Test Method for Determining Molecular Weight Distribution and Molecular Weight Averages of Polyolefins by High Temperature Gel Permeation Chromatography—Copyright ASTM International—Current edition approved Mar. 15, 2006. Published Apr. 2006. Originally approved in 1999. Last previous edition approved in 1999 as D6474-99, pp. 1-6.

ASTM D6645-01—Standard Test Method for Methyl (Comonomer) Content in Polyethylene by Infrared Spectrophotometry—Copyright ASTM International—Current edition approved Mar. 10, 2001. Published Jun. 2001; 4 pages.

ASTM D6988-13—Standard Test Method for Determination of Thickness of Plastic Film Test Specimens—Copyright ASTM International—Current edition approved Apr. 1, 2013. Published Apr. 2013. Originally approved in 2003. Last previous edition approved in 2008 as D6988-08 (pp. 1-7).

ASTM D792-13—Standard Test Method for Density and Specific Gravity (Relative Density) of Plastics by Displacement—Current edition approved Nov. 1, 2013. Published Nov. 2013. Originally approved in 1944. Last previous edition approved in 2008 as D792-08; 6 pages.

ASTM D882-10—Standard Test Method for Tensile Properties of Thin Plastic Sheeting—Copyright ASTM International—Current edition approved Apr. 1, 2010. Published Jun. 2010. Originally approved in 1946; 10 pages.

ASTM D882-12—Standard Test Method for Tensile Properties of Thin Plastic Sheeting—Copyright ASTM International—Current edition approved Aug. 1, 2012. Published Sep. 2012; 11 pages.

Bird, R.B., et al. "Dynamics of Polymeric Liquids," vol. 1: Fluid Mechanics, 2d Ed., Wiley-Interscience Publications (1987) 169-175, 7 pgs.

DesLauriers, Paul J., et al., Quantifying Short Chain Branching Microstructures in Ethylene 1-olefin Copolymers Using Size Exclusion Chromatography and Fourier Transform Infrared Spectroscopy (SEC-FTIR), Polymer 43, (2002) pp. 159-170, 12 pgs.

Hamielec, A., et al., "Copolymerization" in Comprehensive Polymer Science and Supplements, vol. 3, Chapter 2, p. 17, Elsevier, 1996.

International Search Report and Written Opinion in PCT/IB2022/052396, mailed Jun. 10, 2022, 8 pgs.

Kanai T., et al. in the textbook "Film Processing Advances" (2014), Hanser Publishers, Ch. 7, "Biaxial Oriented Film Technology", 193-229 (37 pgs.).

Kanai T., et al. in the textbook "Film Processing Advances" (2014), Hanser Publishers, Ch. 8, "Biaxially Oriented Tentering Film", 231-261 (31 pgs).

(56) References Cited

OTHER PUBLICATIONS

Randall et al., "A Review of High Resolution Liquid 13Carbon Nuclear Magnetic Resonance Characterizations of Ethylene-Based Polymers", JMS—Rev. Macromol. Chem. Phys., 1989, pp. 201, 202, 285, 286.
Soares, J.B.P. et all., "Copolymerization of Olefins in a Series of Continuous Stirred-Tank Slurry-Reactors using Heterogeneous Ziegler-Natta and Metallocene Catalysts. I. General Dynamic Mathematical Model", Polymer Reaction Engineering, 4(2&3), 1996, pp. 153-191, (40 pgs.).
Soares, J.B.P., "Polyolefins with Long Chain Branches Made with Single-Site Coordination Catalysts: a Review of Mathematical Modeling Techniques for Polymer Microstructure," Macromolecular Materials and Engineering, vol. 289, Issue 1, pp. 70-87, Wiley-VCH, 2004, 18 pgs.
Soares, J.B.P., et al., "Polyolefin Reaction Engineering" Wiley-VCH, 2012, 187-269, 84 pgs.
W.W. Graessley, "Effect of Long Branches on the Flow Properties of Polymers," Acc. Chem. Res. 1977, 10, 332-339, 8 pgs.
W.W. Yau and D.R. Hill, "Application of Triple-Detector Size Exclusion Chromatography (On-Line Differential Refractometer, Vixcometer and Light Scattering Detectors) for the Characterization of Brominated Polystyrene," Int. J. Polym. Anal. Charact. 1996; 2:151, 151-171, 22 pgs.
Wild, et al., "Determination of Branching Distributions in Polyethylene and Ethylene Copolymers,", J. Polym. Sci., Part B, Polym. Phys., vol. 20 (3), pp. 441-455, 16 pgs.
Yasuda, K., "Investigation of the Analogies Between Viscometric and Linear Viscoelastic Properties of Polystyrene Fluids," Carreau-Yasuda model (see K. Yasuda (1979) PHD Thesis, IT Cambridge), 220 pgs.

* cited by examiner

POLYETHYLENE COMPOSITION FOR BIAXIAL ORIENTATION

CROSS-REFERENCE TO RELATED APPLICATIONS

This application is a U.S. National Phase Application under 35 U.S.C. 371 of International Patent Application No. PCT/IB2022/052396, filed on Mar. 16, 2022, which in turn claims priority to and the benefit of U.S. Provisional Application No. 63/163,113, filed on Mar. 19, 2021, both of which are incorporated herein by reference in their entirety.

TECHNICAL FIELD

The present disclosure is directed to polyethylene compositions which are useful in the formation of biaxially oriented films.

BACKGROUND ART

Biaxially oriented polyethylene (BOPE) films are prepared by stretching a thick precursor (or base) film, typically known as a cast sheet, in two directions: the machine direction (MD) and the transverse direction (TD). The stretching may be conducted in a single procedure (simultaneous biaxial stretching) or in two sequential procedures (sequential biaxial stretching). The equipment used in the stretching process is commonly referred to as a "tenter frame" line.

In comparison to traditional blown film, BOPE film can achieve up to twice the stiffness (tensile modulus), improved tensile strength, impact strength, puncture resistance, flex cracking resistance and improved (i.e. lower) optical haze.

BOPE films are suitable for a wide variety of packaging applications. The outstanding properties of the film allow the design of "all polyethylene packages" (as opposed to packages made with different types of polymers) and this facilitates recycling.

The tenter frame process is in wide use for the preparation of biaxially oriented polypropylene (BOPP) and biaxially oriented polyethylene terephthalate (BOPET) films. However, polyethylene is comparatively difficult to stretch/biaxially orient and this has limited the commercial use of BOPE. Hence, a need exists for polyethylene compositions that provide "stretchability" in a tenter frame, BOPE process.

SUMMARY OF INVENTION

We have now developed a polyethylene composition which can be successfully employed in the preparation of a BOPE film.

An embodiment of the disclosure is a polyethylene composition comprising: (i) from 5 to 50 weight % of first ethylene copolymer having a weight average molecular weight, Mw of from 170,000 g/mol to 470,000 g/mol; and (ii) from 95 to 50 weight % of a second ethylene copolymer; wherein the first ethylene copolymer has a higher weight average molecular weight, Mw than the second ethylene copolymer; wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.5; wherein the polyethylene composition has a density of from 0.941 to 0.962 g/cm$^3$; a melt index, $I_2$ of from 0.5 to 5.0 g/10 min; a melt flow ratio, $I_{21}/I_2$ of >40; a Z-average molecular weight distribution, Mz/Mw of ≥2.5; a comonomer distribution breadth index, $CDBI_{50}$ of >50 wt %; and a long chain branching factor, LCBF of >0.0010; and wherein in a temperature rising elution fractionation (CTREF) analysis, the polyethylene composition has greater than 70 weight percent of material eluting at a temperature of greater than 90° C.

An embodiment of the disclosure is a biaxially oriented polyethylene film comprising a polyethylene composition, the polyethylene composition comprising: (i) from 5 to 50 weight % of first ethylene copolymer having a weight average molecular weight, Mw of from 170,000 g/mol to 470,000 g/mol; and (ii) from 95 to 50 weight % of a second ethylene copolymer; wherein the first ethylene copolymer has a higher weight average molecular weight, Mw than the second ethylene copolymer; wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.5; wherein the polyethylene composition has a density of from 0.941 to 0.962 g/cm$^3$; a melt index, $I_2$ of from 0.5 to 5.0 g/10 min; a melt flow ratio, $I_{21}/I_2$ of ≥40; a Z-average molecular weight distribution, Mz/Mw of ≥2.5; a comonomer distribution breadth index, $CDBI_{50}$ of >50 wt %; and a long chain branching factor, LCBF of >0.0010; and wherein in a temperature rising elution fractionation (CTREF) analysis, the polyethylene composition has greater than 70 weight percent of material eluting at a temperature of greater than 90° C.

In an embodiment of the disclosure a polyethylene composition has a long chain branching factor, LCBF of >0.0050.

In an embodiment of the disclosure a polyethylene composition has a long chain branching factor, LCBF of >0.0100.

DESCRIPTION OF EMBODIMENTS

Figure 1:
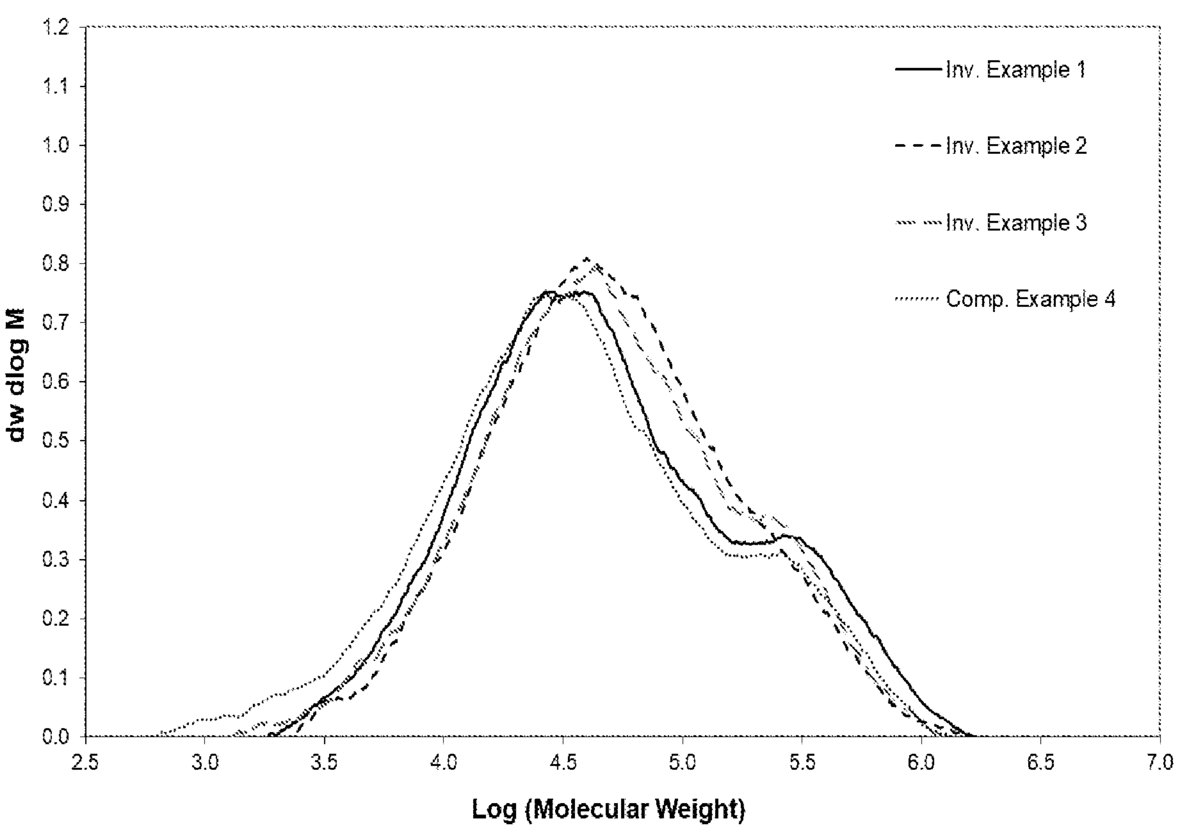
FIG. 1 shows the gel permeation chromatograph with refractive index detection (GPC-RI) obtained for polyethylene compositions made according to the present disclosure as well as for a comparative resin.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

As used herein, the term "monomer" refers to a small molecule that may chemically react and become chemically bonded with itself or other monomers to form a polymer.

As used herein, the term "α-olefin" or "alpha-olefin" is used to describe a monomer having a linear hydrocarbon chain containing from 3 to 20 carbon atoms having a double bond at one end of the chain; an equivalent term is "linear α-olefin". An alpha-olefin may also be referred to as a comonomer.

As used herein, the terms "polyethylene", "polyethylene composition" or "ethylene polymer", refers to macromolecules produced from ethylene monomers and optionally one or more additional monomers; regardless of the specific catalyst or specific process used to make the ethylene polymer. In the polyethylene art, the one or more additional monomers are often called "comonomer(s)" and typically include α-olefins. The term "homopolymer" refers to a polymer that contains only one type of monomer. An "ethylene homopolymer" for example, is made using only ethylene as a polymerizable monomer. The term "copolymer" refers to a polymer that contains two or more types of monomer. An "ethylene copolymer", for example, is made using ethylene and one or more other types of polymerizable monomer (e.g. an alpha-olefin). Common polyethylene types include high density polyethylene (HDPE); medium density polyethylene (MDPE); linear low density polyethylene (LLDPE); and very low density polyethylene (VLPDE) or ultralow density polyethylene (ULPDE) which are also known as plastomers and elastomers. The term polyethylene also includes polyethylene terpolymers which may include two or more comonomers in addition to ethylene. The term polyethylene also includes combination of, or blends of, the polyethylene types described above.

In the present disclosure, the terms "ethylene homopolymer" or "polyethylene homopolymer", is used to refer to a polymer which is the product of a polymerization process, in which only ethylene was deliberately added or deliberately present as a polymerizable monomer.

In the present disclosure, the terms "ethylene copolymer" or "polyethylene copolymer", it is meant that the polymer being referred to is the product of a polymerization process, in which ethylene and one or more than one α-olefin were deliberately added or were deliberately present as a polymerizable monomer.

As used herein the term "unsubstituted" means that hydrogen radicals are bonded to the molecular group that follows the term unsubstituted. The term "substituted" means that the group following this term possesses one or more moieties (non-hydrogen radicals) that have replaced one or more hydrogen radicals in any position within the group.

The term "film" is used herein to mean a film having one or more layers which is formed by the extrusion of a polymer through one or more die openings. The term "film structure" is used to connote that a film has more than one layer (i.e. a film structure that has at least two layers, at least three layers, etc.).

In the present disclosure the term "BOPE film" or "BOPE film structure" generally describes a biaxially oriented film or film structure in which polyethylene is the main constituent polymer (i.e. polyethylene is present in higher weight percent than other, non-polyethylene polymers, based on the total weight of polymer present in the film or film structure).

The phrase "all polyethylene" as used herein, when used to describe a film or a film structure, means that the film or film structure will comprise at least 90 percent by weight of a polyethylene composition (as opposed to non-polyethylene based polymeric materials or compositions), based on the total weight of polymer present in the film or film structure.

The present disclosure provides a polyethylene composition comprising two components: (i) a first ethylene copolymer; and (ii) a second ethylene copolymer which is different from the first ethylene copolymer. Embodiments of the first ethylene copolymer, the second ethylene copolymer and the polyethylene composition are described below.

In an embodiment of the disclosure, the polyethylene composition is useful in the manufacture of BOPE films or BOPE film structures.

The First Ethylene Copolymer

In an embodiment of the disclosure the first ethylene copolymer comprises both polymerized ethylene and at least one polymerized α-olefin comonomer, with polymerized ethylene being the majority species.

In embodiments of the disclosure, α-olefins which may be copolymerized with ethylene to make the first ethylene copolymer may be selected from the group comprising 1-propene, 1-butene, 1-pentene, 1-hexene and 1-octene and mixtures thereof.

In an embodiment of the disclosure, the first ethylene copolymer is made with a single site catalyst, non-limiting examples of which include phosphinimine catalysts, metallocene catalysts, and constrained geometry catalysts, all of which are well known in the art.

In an embodiment of the disclosure the first ethylene copolymer is made using a single site polymerization catalyst (a "SSC").

In an embodiment of the disclosure the first ethylene copolymer is made using a single site polymerization catalyst in a solution phase polymerization process.

In an embodiment of the disclosure, the first ethylene copolymer is made with a single site polymerization catalyst, having hafnium, Hf as the active metal center.

In an embodiment of the disclosure, the first ethylene copolymer is an ethylene/1-octene copolymer.

In an embodiment of the disclosure, the first ethylene copolymer is made with a metallocene catalyst.

In an embodiment of the disclosure, the first ethylene copolymer is made with a bridged metallocene catalyst.

In an embodiment of the disclosure, the first ethylene copolymer is made with a bridged metallocene catalyst having the formula I:

(I)

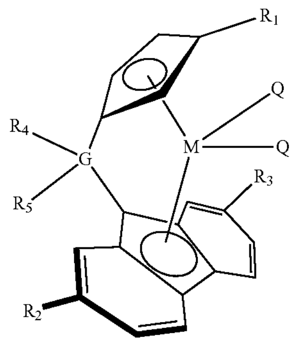

In Formula (I): M is a group 4 metal selected from titanium, zirconium or hafnium; G is a group 14 element selected from carbon, silicon, germanium, tin or lead; $R_1$ is a hydrogen atom, a $C_{1-20}$ hydrocarbyl radical, a $C_{1-20}$ alkoxy radical or a $C_{6-10}$ aryl oxide radical; $R_2$ and $R_3$ are independently selected from a hydrogen atom, a $C_{1-20}$ hydrocarbyl radical, a $C_{1-20}$ alkoxy radical or a $C_{6-10}$ aryl oxide radical; $R_4$ and $R_5$ are independently selected from a hydrogen atom, an unsubstituted $C_{1-20}$ hydrocarbyl radical, a substituted $C_{1-20}$ hydrocarbyl radical, a $C_{1-20}$ alkoxy radical or a $C_{6-10}$ aryl oxide radical; and Q is independently an activatable leaving group ligand.

In an embodiment, G is carbon.

In an embodiment, $R_4$ and $R_5$ are independently an aryl group.

In an embodiment, $R_4$ and $R_5$ are independently a phenyl group or a substituted phenyl group.

In an embodiment, $R_4$ and $R_5$ are a phenyl group.

In an embodiment, $R_4$ and $R_5$ are independently a substituted phenyl group.

In an embodiment, $R_4$ and $R_5$ are a substituted phenyl group, wherein the phenyl group is substituted with a substituted silyl group.

In an embodiment, $R_4$ and $R_5$ are a substituted phenyl group, wherein the phenyl group is substituted with a trialkyl silyl group.

In an embodiment, $R_4$ and $R_5$ are a substituted phenyl group, wherein the phenyl group is substituted at the para position with a trialkylsilyl group. In an embodiment, $R_4$ and $R_5$ are a substituted phenyl group, wherein the phenyl group is substituted at the para position with a trimethylsilyl group. In an embodiment, $R_4$ and $R_5$ are a substituted phenyl group, wherein the phenyl group is substituted at the para position with a triethylsilyl group.

In an embodiment, $R_4$ and $R_5$ are independently an alkyl group.

In an embodiment, $R_4$ and $R_5$ are independently an alkenyl group.

In an embodiment, $R_1$ is hydrogen.

In an embodiment, $R_1$ is an alkyl group.

In an embodiment, $R_1$ is an aryl group.

In an embodiment, $R_1$ is an alkenyl group.

In an embodiment, $R_2$ and $R_3$ are independently a hydrocarbyl group having from 1 to 30 carbon atoms.

In an embodiment, $R_2$ and $R_3$ are independently an aryl group.

In an embodiment, $R_2$ and $R_3$ are independently an alkyl group.

In an embodiment, $R_2$ and $R_3$ are independently an alkyl group having from 1 to 20 carbon atoms.

In an embodiment, $R_2$ and $R_3$ are independently a phenyl group or a substituted phenyl group.

In an embodiment, $R_2$ and $R_3$ are a tert-butyl group.

In an embodiment, $R_2$ and $R_3$ are hydrogen.

In an embodiment M is hafnium, Hf.

In the current disclosure, the term "activatable", means that the ligand Q may be cleaved from the metal center M via a protonolysis reaction or abstracted from the metal center M by suitable acidic or electrophilic catalyst activator compounds (also known as "co-catalyst" compounds) respectively, examples of which are described below. The activatable ligand Q may also be transformed into another ligand which is cleaved or abstracted from the metal center M (e.g. a halide may be converted to an alkyl group). Without wishing to be bound by any single theory, protonolysis or abstraction reactions generate an active "cationic" metal center which can polymerize olefins.

In embodiments of the present disclosure, the activatable ligand, Q is independently selected from the group consisting of a hydrogen atom; a halogen atom; a $C_{1-20}$ hydrocarbyl radical, a $C_{1-20}$ alkoxy radical, and a $C_{6-10}$ aryl or aryloxy radical, where each of the hydrocarbyl, alkoxy, aryl, or aryl oxide radicals may be un-substituted or further substituted by one or more halogen or other group; a $C_{1-8}$ alkyl; a $C_{1-8}$ alkoxy; a $C_{6-10}$ aryl or aryloxy; an amido or a phosphido radical, but where Q is not a cyclopentadienyl. Two Q ligands may also be joined to one another and form for example, a substituted or unsubstituted diene ligand (e.g. 1,3-butadiene); or a delocalized heteroatom containing group such as an acetate or acetamidinate group. In a convenient embodiment of the disclosure, each Q is independently selected from the group consisting of a halide atom, a $C_{1-4}$ alkyl radical and a benzyl radical. Particularly suitable activatable ligands, Q, in embodiments of the disclosure are monoanionic such as a halide (e.g. chloride) or a hydrocarbyl (e.g. methyl, benzyl).

In an embodiment of the disclosure, the single site catalyst used to make the first ethylene copolymer is diphenylmethylene(cyclopentadienyl)(2,7-di-t-butylfluorenyl)hafnium dichloride having the molecular formula:

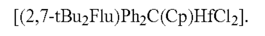

$[(2,7\text{-}tBu_2Flu)Ph_2C(Cp)HfCl_2]$.

In an embodiment of the disclosure the single site catalyst used to make the first ethylene copolymer is diphenylmethylene(cyclopentadienyl)(2,7-di-t-butylfluorenyl)hafnium dimethyl having the molecular formula:

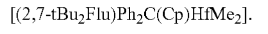

$[(2,7\text{-}tBu_2Flu)Ph_2C(Cp)HfMe_2]$.

In addition to the single site catalyst molecule per se, an active single site catalyst system may further comprise one or more of the following: an alkylaluminoxane co-catalyst and an ionic activator. The single site catalyst system may also optionally comprise a hindered phenol.

Although the exact structure of alkylaluminoxane is uncertain, subject matter experts generally agree that it is an oligomeric species that contain repeating units of the general formula:

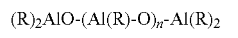

$$(R)_2AlO\text{-}(Al(R)\text{-}O)_n\text{-}Al(R)_2$$

where the R groups may be the same or different linear, branched or cyclic hydrocarbyl radicals containing 1 to 20 carbon atoms and n is from 0 to about 50. A non-limiting example of an alkylaluminoxane is methylaluminoxane (or MAO) wherein each R group is a methyl radical.

In an embodiment of the disclosure, R of the alkylaluminoxane, is a methyl radical and m is from 10 to 40.

In an embodiment of the disclosure, the co-catalyst is modified methylaluminoxane (MMAO).

It is well known in the art, that the alkylaluminoxane can serve dual roles as both an alkylator and an activator. Hence, an alkylaluminoxane co-catalyst is often used in combination with activatable ligands such as halogens.

In general, ionic activators are comprised of a cation and a bulky anion; wherein the latter is substantially non-coordinating. Non-limiting examples of ionic activators are boron ionic activators that are four coordinate with four ligands bonded to the boron atom. Non-limiting examples of boron ionic activators include the following formulas shown below:

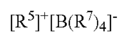

$$[R^5]^+[B(R^7)_4]^-$$

where B represents a boron atom, $R^5$ is an aromatic hydrocarbyl (e.g. triphenyl methyl cation) and each $R^7$ is independently selected from phenyl radicals which are unsubstituted or substituted with from 3 to 5 substituents selected from fluorine atoms, $C_{1-4}$ alkyl or alkoxy radicals which are unsubstituted or substituted by fluorine atoms; and a silyl radical of formula —Si$(R^9)_3$, where each $R^9$ is independently selected from hydrogen atoms and $C_{1-4}$ alkyl radicals, and

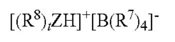

$$[(R^8)_tZH]^+[B(R^7)_4]^-$$

where B is a boron atom, H is a hydrogen atom, Z is a nitrogen or phosphorus atom, t is 2 or 3 and $R^8$ is selected from $C_{1-8}$ alkyl radicals, phenyl radicals which are unsubstituted or substituted by up to three $C_{1-4}$ alkyl radicals, or one $R^8$ taken together with the nitrogen atom may form an anilinium radical and $R^7$ is as defined above.

In both formula a non-limiting example of $R^7$ is a pentafluorophenyl radical. In general, boron ionic activators may be described as salts of tetra(perfluorophenyl) boron; non-limiting examples include anilinium, carbonium, oxonium, phosphonium and sulfonium salts of tetra(perfluorophenyl)boron with anilinium and trityl (or triphenylmethylium). Additional non-limiting examples of ionic activators include: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl)boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl)ammonium tetra(o-tolyl)boron, N,N-dimethylanilinium tetra(phenyl)boron, N,N-diethylanilinium tetra(phenyl)boron, N,N-diethylanilinium tetra(phenyl)n-butylboron, N,N-2,4,6-pentamethylanilinium tetra(phenyl)boron, di-(isopropyl)ammonium tetra(pentafluorophenyl)boron, dicyclohexylammonium tetra(phenyl)boron, triphenylphosphonium tetra(phenyl)boron, tri(methylphenyl)phosphonium tetra(phenyl)boron, tri(dimethylphenyl)phosphonium tetra(phenyl)boron, tropylium tetrakispentafluorophenyl borate, triphenylmethylium tetrakispentafluorophenyl borate, benzene(diazonium)tetrakispentafluorophenyl borate, tropylium tetrakis(2,3,5,6-tetrafluorophenyl)borate, triphenylmethylium tetrakis(2,3,5,6-tetrafluorophenyl)borate, benzene(diazonium) tetrakis(3,4,5-trifluorophenyl)borate, tropylium tetrakis(3,4,5-trifluorophenyl)borate, benzene(diazonium) tetrakis(3,4,5-trifluorophenyl)borate, tropylium tetrakis(1,2,2-trifluoroethenyl)borate, triphenylmethylium tetrakis(1,2,2-trifluoroethenyl)borate, benzene(diazonium) tetrakis(1,2,2-trifluoroethenyl)borate, tropylium tetrakis(2,3,4,5-tetrafluorophenyl)borate, triphenylmethylium tetrakis(2,3,4,5-tetrafluorophenyl)borate, and benzene(diazonium) tetrakis (2,3,4,5 tetrafluorophenyl)borate. Readily available commercial ionic activators include N,N-dimethylanilinium tetrakispentafluorophenyl borate, and triphenylmethylium tetrakispentafluorophenyl borate.

Non-limiting example of hindered phenols include butylated phenolic antioxidants, butylated hydroxytoluene, 2,6-di-tertiarybutyl-4-ethyl phenol, 4,4'-methylenebis (2,6-di-tertiary-butylphenol), 1,3,5-trimethyl-2,4,6-tris (3,5-di-tert-butyl-4-hydroxybenzyl) benzene and octadecyl-3-(3',5'-di-tert-butyl-4'-hydroxyphenyl) propionate.

To produce an active single site catalyst system the quantity and mole ratios of the three or four components: the single site catalyst molecule (e.g. the metallocne), the alkylaluminoxane, the ionic activator, and the optional hindered phenol are optimized.

In an embodiment of the disclosure, the single site catalyst used to make the first ethylene copolymer produces long chain branches, and the first ethylene copolymer will contain long chain branches, hereinafter 'LCB'.

LCB is a well-known structural phenomenon in ethylene copolymers and well known to those of ordinary skill in the art. Traditionally, there are three methods for LCB analysis, namely, nuclear magnetic resonance spectroscopy (NMR), for example see J. C. Randall, J Macromol. Sci., Rev. Macromol. Chem. Phys. 1989, 29, 201; triple detection SEC equipped with a DRI, a viscometer and a low-angle laser light scattering detector, for example see W. W. Yau and D. R. Hill, Int. J. Polym. Anal. Charact. 1996; 2:151; and rheology, for example see W. W. Graessley, Acc. Chem. Res. 1977, 10, 332-339. In embodiments of this disclosure, a long chain branch is macromolecular in nature, i.e. long enough to be seen in an NMR spectra, triple detector SEC experiments or rheological experiments.

In an embodiment of the disclosure, the first ethylene copolymer contains long chain branching characterized by the long chain branching factor, LCBF disclosed herein. In embodiments of the disclosure, the upper limit on the LCBF of the first ethylene copolymer may be 0.5000, or 0.4000, or 0.3000 (dimensionless). In embodiments of the disclosure, the lower limit on the LCBF of the first ethylene copolymer may be 0.0010, or 0.0015, or 0.0020, or 0.0100, or 0.0500, or 0.1000 (dimensionless).

The first ethylene copolymer may contain catalyst residues that reflect the chemical composition of the catalyst formulation used to make it. Those skilled in the art will understand that catalyst residues are typically quantified by the parts per million of metal, in for example the first ethylene copolymer (or the polyethylene composition; see below), where the metal present originates from the metal in the catalyst formulation used to make it. Non-limiting examples of the metal residue which may be present include Group 4 metals, titanium, zirconium and hafnium. In embodiments of the disclosure, the upper limit on the ppm of metal in the first ethylene copolymer may be about 3.0 ppm, in other cases about 2.0 ppm and in still other cases about 1.5 ppm. In embodiments of the disclosure, the lower limit on the ppm of metal in the first ethylene copolymer may be about 0.03 ppm, in other cases about 0.09 ppm and in still other cases about 0.15 ppm.

The short chain branching in the first ethylene copolymer (i.e. the short chain branching per thousand backbone carbon atoms, SCB1 or SCB1/1000 Cs) is the branching due to the presence of an α-olefin comonomer in the first ethylene copolymer and will for example have two carbon atoms for a 1-butene comonomer, or four carbon atoms for a 1-hexene comonomer, or six carbon atoms for a 1-octene comonomer, etc.

In an embodiment of the disclosure, the first ethylene copolymer has from 1 to 50 short chain branches per thousand carbon atoms (SCB1). In further embodiments, the first ethylene copolymer has from 1 to 25 short chain branches per thousand carbon atoms (SCB1), or from 1 to 15 short chain branches per thousand carbon atoms (SCB1), or from 1 to 10 short chain branches per thousand carbon atoms (SCB1).

In an embodiment of the disclosure, the number of short chain branches per thousand carbon atoms in the first ethylene copolymer (SCB1), is greater than the number of short chain branches per thousand carbon atoms in the second ethylene copolymer (SCB2).

In an embodiment of the disclosure, the first ethylene copolymer has from 0.5 to 25.0 short chain branches per thousand carbon atoms (SCB1). In an embodiment of the disclosure, the first ethylene copolymer has from 0.5 to 20.0 short chain branches per thousand carbon atoms (SCB1). In an embodiment of the disclosure, the first ethylene copolymer has from 0.5 to 15.0 short chain branches per thousand carbon atoms (SCB1). In an embodiment of the disclosure, the first ethylene copolymer has from 0.5 to 10.0 short chain branches per thousand carbon atoms (SCB1). In an embodiment of the disclosure, the first ethylene copolymer has from 0.5 to 7.5 short chain branches per thousand carbon atoms (SCB1). In an embodiment of the disclosure, the first ethylene copolymer has from 0.5 to 5.0 short chain branches per thousand carbon atoms (SCB1). In an embodiment of the disclosure, the first ethylene copolymer has from 1.0 to 25 short chain branches per thousand carbon atoms (SCB1). In an embodiment of the disclosure, the first ethylene copolymer has from 1.0 to 20.0 short chain branches per thousand carbon atoms (SCB1). In an embodiment of the disclosure, the first ethylene copolymer has from 1.0 to 15.0 short chain branches per thousand carbon atoms (SCB1). In an embodiment of the disclosure, the first ethylene copolymer has from 1.0 to 10.0 short chain branches per thousand carbon atoms (SCB1). In an embodiment of the disclosure, the first ethylene copolymer has from 1.0 to 7.5 short chain branches per thousand carbon atoms (SCB1). In an embodiment of the disclosure, the first ethylene copolymer has from 1.0 to 5.0 short chain branches per thousand carbon atoms (SCB1). In an embodiment of the disclosure, the first ethylene copolymer has from 1.5 to 25 short chain branches per thousand carbon atoms (SCB1). In an embodiment of the disclosure, the first ethylene copolymer has from 1.5 to 20.0 short chain branches per thousand carbon atoms (SCB1). In an embodiment of the disclosure, the first ethylene copolymer has from 1.5 to 15.0 short chain branches per thousand carbon atoms (SCB1). In an embodiment of the disclosure, the first ethylene copolymer has from 1.5 to 10.0 short chain branches per thousand carbon atoms (SCB1). In an embodiment of the disclosure, the first ethylene copolymer has from 1.5 to 7.5 short chain branches per thousand carbon atoms (SCB1). In an embodiment of the disclosure, the first ethylene copolymer has from 1.5 to 5.0 short chain branches per thousand carbon atoms (SCB1). In an embodiment of the disclosure, the first ethylene copolymer has from 2.0 to 25 short chain branches per thousand carbon atoms (SCB1). In an embodiment of the disclosure, the first ethylene copolymer has from 2.0 to 20.0 short chain branches per thousand carbon atoms (SCB1). In an embodiment of the disclosure, the first ethylene copolymer has from 2.0 to 15.0 short chain branches per thousand carbon atoms (SCB1). In an embodiment of the disclosure, the first ethylene copolymer has from 2.0 to 10.0 short chain branches per thousand carbon atoms (SCB1). In an embodiment of the disclosure, the first ethylene copolymer has from 2.0 to 7.5 short chain branches per thousand carbon atoms (SCB1). In an embodiment of the disclosure, the first ethylene copolymer has from 2.0 to 5.0 short chain branches per thousand carbon atoms (SCB1). In an embodiment of the disclosure, the first ethylene copolymer has from 2.3 to 25.0 short chain branches per thousand carbon atoms (SCB1). In an embodiment of the disclosure, the first ethylene copolymer has from 2.3 to 20.0 short chain branches per thousand carbon atoms (SCB1). In an embodiment of the disclosure, the first ethylene copolymer has from 2.3 to 15.0 short chain branches per thousand carbon atoms (SCB1). In an embodiment of the disclosure, the first ethylene copolymer has from 2.3 to 10.0 short chain branches per thousand carbon atoms (SCB1). In an embodiment of the disclosure, the first ethylene copolymer has from 2.3 to 7.5 short chain branches per thousand carbon atoms (SCB1). In an embodiment of the disclosure, the first ethylene copolymer has from 2.3 to 5.0 short chain branches per thousand carbon atoms (SCB1).

In an embodiment of the disclosure, the first ethylene copolymer has fewer than (<) 10 short chain branches per thousand carbon atoms (SCB1). In an embodiment of the disclosure, the first ethylene copolymer has fewer than (<) 7.5 short chain branches per thousand carbon atoms (SCB1). In an embodiment of the disclosure, the first ethylene copolymer has fewer than (<) 5.0 short chain branches per thousand carbon atoms (SCB1). In an embodiment of the disclosure, the first ethylene copolymer has fewer than (<) 4.0 short chain branches per thousand carbon atoms (SCB1).

In an embodiment of the disclosure, the density of the first copolymer is less than the density of the second ethylene copolymer.

In an embodiment of the disclosure, the first ethylene copolymer has a density of from 0.910 to 0.975 g/cm$^3$, including any narrower ranges within this range and any values encompassed by these ranges. For example, in embodiments of the disclosure, the first ethylene copolymer has a density of from 0.930 to 0.970 g/cm$^3$, or from 0.930 to 0.965 g/cm$^3$, or from 0.930 to 0.960 g/cm$^3$, or from 0.935 to 0.965 g/cm$^3$, or from 0.935 to 0.960 g/cm$^3$, or from 0.935 to 0.955 g/cm$^3$, or from 0.935 to 0.950 g/cm$^3$, or from 0.930 to 0.950 g/cm$^3$, or from 0.930 to 0.955 g/cm$^3$. In other embodiments of the disclosure, the first ethylene copolymer has a density of from 0.915 to 0.945 g/cm$^3$, or from 0.915 to 0.940 g/cm$^3$, or from 0.915 to 0.935 g/cm$^3$, or from 0.915 to 0.930 g/cm$^3$, or from 0.920 to 0.930 g/cm$^3$.

In embodiments of the disclosure the first ethylene copolymer has a melt index, $I_2$ of, ≤5.0 g/10 min, or <5.0 g/10 min, or ≤2.5 g/10 min, or <2.5 g/10 min, or ≤1.0 g/10 min, or <1.0 g/10 min, or ≤0.5 g/10 min, or <0.5 g/10 min, or ≤0.4 g/10 min, or <0.4 g/10 min, or ≤0.2 g/10 min, or <0.2 g/10 min.

In embodiments of the disclosure, the first ethylene copolymer has a melt index, 12 of from 0.001 to 5.0 g/10 min, including any narrower ranges within this range and any values encompassed by these ranges. For example, in embodiments of the disclosure, the melt index, 12 of the first ethylene copolymer may be from 0.01 to 5.0 g/10 min, or from 0.01 to 2.5 g/10 min, or from 0.01 to 2.0 g/10 min, or from 0.01 to 1.5 g/10 min, or 0.01 to 1.0 g/10 min, or from 0.01 to 0.5 g/10 min, or from 0.01 to 0.4 g/10 min, or from 0.01 to 0.2 g/10 min.

In an embodiment of the disclosure, the melt index, $I_2$ of the first ethylene copolymer is less than the melt index, $I_2$ of second ethylene copolymer.

In embodiments of the disclosure, the first ethylene copolymer has a weight average molecular weight, $M_w$ of greater than 170,000 g/mol, or greater than 175,000 g/mol, or greater than 200,000 g/mol.

In embodiments of the disclosure, the first ethylene copolymer has a weight average molecular weight, $M_w$ of from 150,000 to 500,000 g/mol including any narrower ranges within this range and any values encompassed by these ranges. For example, in embodiments of the disclosure, the first ethylene copolymer has a weight average molecular weight, $M_w$ of from 175,000 to 475,000 g/mol, or from 180,000 to 470,000 g/mol, or from 175,000 to 400,000 g/mol, or from 175,000 to 350,000 g/mol, or from 200,000 to 475,000 g/mol, or from 200,000 to 400,000 g/mol, or from 200,000 to 350,000 g/mol, or from 200,000 to 325,000 g/mol. In other embodiments of the disclosure, the first ethylene copolymer has a weight average molecular weight, $M_w$ of from 170,000 to 475,000 g/mol, or from 170,000 to 470,000 g/mol, or from 170,000 to 400,000 g/mol, or from 170,000 to 350,000 g/mol, or from 175,000 to 475,000 g/mol, or from 175,000 to 400,000 g/mol, or from 160,000 to 350,000 g/mol, or from 160,000 to 325,000 g/mol.

In an embodiment of the disclosure, the weight average molecular weight, Mw of the first ethylene copolymer is higher than the weight average molecular weight, Mw of the second ethylene copolymer.

In an embodiment of the disclosure, the first ethylene copolymer has a melt flow ratio, $I_{21}/I_2$ of less than 25, or less than 23, or less than 20.

In embodiments of the disclosure, the upper limit on the molecular weight distribution, $M_w/M_n$ of the first ethylene copolymer may be about 2.7, or about 2.5, or about 2.4, or about 2.3, or about 2.2. In embodiments of the disclosure, the lower limit on the molecular weight distribution, $M_w/M_n$ of the first ethylene copolymer may be about 1.6, or about 1.7, or about 1.8, or about 1.9.

In embodiments of the disclosure, the first ethylene copolymer has a molecular weight distribution, $M_w/M_n$ of ≤3.0, or <3.0, or ≤2.7, or <2.7, or ≤2.5, or <2.5, or ≤2.3, or <2.3, or ≤2.1, or <2.1, or about 2. In another embodiment of the disclosure, the first ethylene copolymer has a molecular weight distribution, $M_w/M_n$ of from 1.7 to 3.0, including any narrower ranges within this range and any values encompassed by these ranges. For example, in embodiments of the disclosure, the first ethylene copolymer has a molecular weight distribution, $M_w/M_n$ of from 1.7 to 2.7, or from 1.8 to 2.7, or from 1.8 to 2.5, or from 1.8 to 2.3, or from 1.9 to 2.1, or about 2.0.

In an embodiment of the disclosure, a single site catalyst which gives an ethylene copolymer having a $CDBI_{50}$ of at least 65% by weight, or at least 70%, or at least 75%, or at least 80%, or at least 85%, during solution phase polymerization in a single reactor, is used in the preparation of the first ethylene copolymer.

In embodiments of the disclosure, the weight percent (wt %) of the first ethylene copolymer in the polyethylene composition (i.e. the weight percent of the first ethylene copolymer based on the total weight of the first ethylene copolymer and the second ethylene copolymer) may be from about 5 wt % to about 60 wt %, including any narrower ranges within this range and any values encompassed by these ranges. For example, in embodiments of the disclosure, the weight percent (wt %) of the first ethylene copolymer in the polyethylene copolymer composition may be from about 5 wt % to about 50 wt %, or from about 10 wt % to about 40 wt %, or from about 15 wt % to about 40 wt %, or from about 15 wt % to about 35 wt %, or from about 10 wt % to about 35 wt %, or from 20 wt % to 50 wt %, or from 20 wt % to 40 wt %, or from 25 wt % to 50 wt %.

The Second Ethylene Copolymer

In an embodiment of the disclosure the second ethylene copolymer comprises both polymerized ethylene and at least one polymerized α-olefin comonomer, with polymerized ethylene being the majority species.

In embodiments of the disclosure, α-olefins which may be copolymerized with ethylene to make the second ethylene copolymer may be selected from the group comprising 1-propene, 1-butene, 1-pentene, 1-hexene and 1-octene and mixtures thereof.

In an embodiment of the disclosure, the second ethylene copolymer is made with a multi-site catalyst system, non-limiting examples of which include Ziegler-Natta catalysts and chromium catalysts, both of which are well known in the art.

In an embodiment of the disclosure, the second ethylene copolymer is made with a Ziegler-Natta catalyst system.

In an embodiment of the disclosure, the second ethylene copolymer is made with a Ziegler-Natta catalyst system in a solution phase polymerization process.

Ziegler-Natta catalyst systems are well known to those skilled in the art. A Ziegler-Natta catalyst may be an in-line Ziegler-Natta catalyst system or a batch Ziegler-Natta catalyst system. The term "in-line Ziegler-Natta catalyst system" refers to the continuous synthesis of a small quantity of an active Ziegler-Natta catalyst system and immediately injecting this catalyst into at least one continuously operating reactor, wherein the catalyst polymerizes ethylene and one or more optional α-olefins to form an ethylene polymer. The terms "batch Ziegler-Natta catalyst system" or "batch Ziegler-Natta procatalyst" refer to the synthesis of a much larger quantity of catalyst or procatalyst in one or more mixing vessels that are external to, or isolated from, the continuously operating solution polymerization process. Once prepared, the batch Ziegler-Natta catalyst system, or batch Ziegler-Natta procatalyst, is transferred to a catalyst storage tank. The term "procatalyst" refers to an inactive catalyst system (inactive with respect to ethylene polymerization); the procatalyst is converted into an active catalyst by adding an alkyl aluminum co-catalyst. As needed, the procatalyst is pumped from the storage tank to at least one continuously operating reactor, wherein an active catalyst polymerizes ethylene and one or more optional α-olefins to form a ethylene copolymer. The procatalyst may be converted into an active catalyst in the reactor or external to the reactor, or on route to the reactor.

A wide variety of compounds can be used to synthesize an active Ziegler-Natta catalyst system. The following describes various compounds that may be combined to produce an active Ziegler-Natta catalyst system. Those skilled in the art will understand that the embodiments in this disclosure are not limited to the specific compounds disclosed.

An active Ziegler-Natta catalyst system may be formed from: a magnesium compound, a chloride compound, a metal compound, an alkyl aluminum co-catalyst and an aluminum alkyl. As will be appreciated by those skilled in the art, Ziegler-Natta catalyst systems may contain additional components; a non-limiting example of an additional component is an electron donor, e.g. amines or ethers.

A non-limiting example of an active in-line (or batch) Ziegler-Natta catalyst system can be prepared as follows. In the first step, a solution of a magnesium compound is reacted with a solution of a chloride compound to form a magnesium chloride support suspended in solution. Non-limiting examples of magnesium compounds include $Mg(R^1)_2$; wherein the $R^1$ groups may be the same or different, linear, branched or cyclic hydrocarbyl radicals containing 1 to 10 carbon atoms. Non-limiting examples of chloride compounds include $R^2Cl$; wherein $R^2$ represents a hydrogen atom, or a linear, branched or cyclic hydrocarbyl radical containing 1 to 10 carbon atoms. In the first step, the solution of magnesium compound may also contain an aluminum alkyl compound. Non-limiting examples of aluminum alkyl compounds include $Al(R^3)_3$, wherein the $R^3$ groups may be the same or different, linear, branched or cyclic hydrocarbyl radicals containing from 1 to 10 carbon atoms. In the second step a solution of the metal compound is added to the solution of magnesium chloride and the metal compound is supported on the magnesium chloride. Non-limiting examples of suitable metal compounds include $M(X)_n$ or $MO(X)_n$; where M represents a metal selected from Group 4 through Group 8 of the Periodic Table, or mixtures of metals selected from Group 4 through Group 8; O represents oxygen; X represents chloride or bromide; and n is an integer from 3 to 6 that satisfies the oxidation state of the metal. Additional non-limiting examples of suitable metal compounds include Group 4 to Group 8 metal alkyls, metal alkoxides (which may be prepared by reacting a metal alkyl with an alcohol) and mixed-ligand metal compounds that contain a mixture of halide, alkyl and alkoxide ligands. In an embodiment of the disclosure, a suitable metal compound is titanium tetrachloride, $TiCl_4$. In the third step a solution of an alkyl aluminum co-catalyst is added to the metal compound supported on the magnesium chloride. A wide variety of alkyl aluminum co-catalysts are suitable, as expressed by formula:

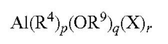

$$Al(R^4)_p(OR^9)_q(X)_r$$

wherein the $R^4$ groups may be the same or different, hydrocarbyl groups having from 1 to 10 carbon atoms; the $OR^9$ groups may be the same or different, alkoxy or aryloxy groups wherein $R^9$ is a hydrocarbyl group having from 1 to 10 carbon atoms bonded to oxygen; X is chloride or bromide; and (p+q+r)=3, with the proviso that p is greater than 0. Non-limiting examples of commonly used alkyl aluminum co-catalysts include trimethyl aluminum, triethyl aluminum, tributyl aluminum, dimethyl aluminum methoxide, diethyl aluminum ethoxide, dibutyl aluminum butoxide, dimethyl aluminum chloride or bromide, diethyl aluminum chloride or bromide, dibutyl aluminum chloride or bromide and ethyl aluminum dichloride or dibromide.

The process described in the paragraph above, to synthesize an active in-line (or batch) Ziegler-Natta catalyst system, can be carried out in a variety of solvents; non-limiting examples of solvents include linear or branched $C_5$ to $C_{12}$ alkanes or mixtures thereof.

The second ethylene copolymer may contain catalyst residues that reflect the chemical composition of the catalyst formulation used to make it. Those skilled in the art will understand that catalyst residues are typically quantified by the parts per million of metal, in for example the second ethylene copolymer (or the polyethylene composition; see below), where the metal present originates from the metal in the catalyst formulation used to make it. Non-limiting examples of the metal residue which may be present include Group 4 metals, titanium, zirconium and hafnium. In embodiments of the disclosure, the upper limit on the ppm of metal in the second ethylene copolymer may be about 3.0 ppm, in other cases about 2.0 ppm and in still other cases about 1.5 ppm. In embodiments of the disclosure, the lower limit on the ppm of metal in the second ethylene copolymer may be about 0.03 ppm, in other cases about 0.09 ppm and in still other cases about 0.15 ppm.

The short chain branching in the second ethylene copolymer (i.e. the short chain branching per thousand backbone carbon atoms, SCB2 or SCB2/1000 Cs) is the branching due to the presence of an α-olefin comonomer in the first ethylene copolymer and will for example have two carbon atoms for a 1-butene comonomer, or four carbon atoms for a 1-hexene comonomer, or six carbon atoms for a 1-octene comonomer, etc.

In an embodiment of the disclosure, the number of short chain branches per thousand carbon atoms in the second ethylene copolymer (SCB2), is fewer than the number of short chain branches per thousand carbon atoms in the first ethylene copolymer (SCB1).

In an embodiment of the disclosure, the second ethylene copolymer has from 0.5 to 15.0 short chain branches per thousand carbon atoms (SCB2). In an embodiment of the disclosure, the second ethylene copolymer has from 0.5 to 10.0 short chain branches per thousand carbon atoms (SCB2). In an embodiment of the disclosure, the second ethylene copolymer has from 0.5 to 5.0 short chain branches per thousand carbon atoms (SCB2). In an embodiment of the disclosure, the second ethylene copolymer has from 0.5 to 2.5 short chain branches per thousand carbon atoms (SCB2). In an embodiment of the disclosure, the second ethylene copolymer has from 0.5 to 2.2 short chain branches per thousand carbon atoms (SCB2). In an embodiment of the disclosure, the second ethylene copolymer has from 1.0 to 15.0 short chain branches per thousand carbon atoms (SCB2). In an embodiment of the disclosure, the second ethylene copolymer has from 1.0 to 10.0 short chain branches per thousand carbon atoms (SCB2). In an embodiment of the disclosure, the second ethylene copolymer has from 1.0 to 5.0 short chain branches per thousand carbon atoms (SCB2). In an embodiment of the disclosure, the second ethylene copolymer has from 1.0 to 2.5 short chain branches per thousand carbon atoms (SCB2). In an embodiment of the disclosure, the second ethylene copolymer has from 1.0 to 2.2 short chain branches per thousand carbon atoms (SCB2).

In an embodiment of the disclosure, the second ethylene copolymer has fewer than (<) 5.0 short chain branches per thousand carbon atoms (SCB2). In an embodiment of the disclosure, the second ethylene copolymer has fewer than (<) 3.0 short chain branches per thousand carbon atoms (SCB2).

In an embodiment of the disclosure, the density of the second copolymer is greater than the density of the first ethylene copolymer.

In an embodiment of the disclosure, the second ethylene copolymer has a density of from 0.920 to 0.975 g/cm$^3$, including any narrower ranges within this range and any values encompassed by these ranges. For example, in embodiments of the disclosure, the second ethylene copolymer has a density of from 0.940 to 0.970 g/cm$^3$, or from 0.940 to 0.965 g/cm$^3$, or from 0.940 to 0.960 g/cm$^3$, or from 0.942 to 0.967 g/cm$^3$, or from 0.942 to 0.965 g/cm$^3$, or from 0.942 to 0.960 g/cm$^3$, or from 0.940 to 0.955 g/cm$^3$, or from 0.935 to 0.960 g/cm$^3$, or from 0.935 to 0.955 g/cm$^3$, or from 0.942 to 0.955 g/cm$^3$, or from 0.945 to 0.955 g/cm$^3$. In other embodiments of the disclosure, the second ethylene copolymer has a density of from 0.920 to 0.960 g/cm$^3$, or from 0.920 to 0.955 g/cm$^3$, or from 0.920 to 0.950 g/cm$^3$, or from 0.920 to 0.945 g/cm$^3$, or from 0.920 to 0.940 g/cm$^3$.

In embodiments of the disclosure the second ethylene copolymer has a melt index, $I_2$ of ≥10.0 g/10 min, or >10.0 g/10 min, or ≥20.0 g/10 min, or >20 g/10 min, or ≥25.0 g/10 min, or >25 g/10 min.

In embodiments of the disclosure the second ethylene copolymer has a melt index, $I_2$ of from 10 to 1,000 including any narrower ranges within this range and any values encompassed by these ranges. For example, in embodiments of the disclosure, the melt index, $I_2$ of the second ethylene copolymer is from 10 to 500 g/10 min, or from 10 to 250 g/10 min, or from 10 to 150 g/10 min, or from 20 to 500 g/10 min, or from 20 to 250 g/10 min, or from 20 to 150 g/10 min, or from 10 to 100 g/10 min, or from 20 to 100 g/10 min, or from 10 to 75 g/10 min, or from 20 to 75 g/10 min.

In an embodiment of the disclosure, the melt index, 12 of the second ethylene copolymer is greater than the melt index, 12 of first ethylene copolymer.

In an embodiment of the disclosure, the second ethylene copolymer has a weight average molecular weight, $M_w$ of <75,000 g/mol, or <60,000 g/mol, or <50,000 g/mol, or <45,000 g/mol. In another embodiment the second ethylene copolymer has a weight average molecular weight, $M_w$ of from 5,000 to 75,000 g/mol, including any narrower ranges within this range and any values encompassed by these ranges. For example, in embodiments of the disclosure, the second ethylene copolymer has a weight average molecular weight, $M_w$ of from 10,000 to 75,000 g/mol, or from 15,000 to 75,000 g/mol, or from 15,000 to 65,000 g/mol, or from 15,000 to 60,000 g/mol, or from 15,000 to 50,000 g/mol, or from 20,000 to 60,000 g/mol, or from 20,000 to 55,000 g/mol, or from 20,000 to 50,000 g/mol, or from 20,000 to 45,000 g/mol, or from 30,000 to 55,000 g/mol, or from 30,000 to 50,000 g/mol, or from 30,000 to 45,000 g/mol.

In an embodiment of the disclosure, the weight average molecular weight, Mw of the second ethylene copolymer is lower than the weight average molecular weight, Mw of the first ethylene copolymer.

In embodiments of the disclosure, the second ethylene copolymer has a molecular weight distribution, $M_w/M_n$ of ≥2.3, or >2.3, or ≥2.5, or >2.5, or ≥2.7, or >2.7, or ≥2.9, or >2.9, or ≥3.0, or 3.0. In embodiments of the disclosure, the second ethylene copolymer has a molecular weight distribution, $M_w/M_n$ of from 2.3 to 6.0, or from 2.3 to 5.5, or from 2.3 to 5.0, or from 2.3 to 4.5, or from 2.3 to 4.0, or from 2.3 to 3.5, or from 2.3 to 3.0, or from 2.5 to 5.0, or from 2.5 to 4.5, or from 2.5 to 4.0, or from 2.5 to 3.5, or from 2.7 to 5.0, or from 2.7 to 4.5, or from 2.7 to 4.0, or from 2.7 to 3.5.

In an embodiment of the disclosure, a multi-site catalyst which gives an ethylene copolymer having a $CDBI_{50}$ of less than 60% by weight, or less than 50 wt %, during solution phase polymerization in a single reactor, is used in the preparation of the second ethylene copolymer.

In embodiments of the disclosure, the weight percent (wt %) of the second ethylene copolymer in the polyethylene composition (i.e. the weight percent of the second ethylene copolymer based on the total weight of the first ethylene copolymer and the second ethylene copolymer) may be from about 95 wt % to about 40 wt %, including any narrower ranges within this range and any values encompassed by these ranges. For example, in embodiments of the disclosure, the weight percent (wt %) of the second ethylene copolymer in the polyethylene copolymer composition may be from about 95 wt % to about 50 wt %, or from about 90 wt % to about 40 wt %, or from about 85 wt % to about 50 wt %, or from about 90 wt % to about 60 wt %, or from about 85 wt % to about 60 wt % or from about 85 wt % to about 65 wt %, or from 75 wt % to 50 wt %.

The Polyethylene Composition

In an embodiment of the disclosure, the polyethylene composition will comprise a first ethylene copolymer and a second ethylene copolymer (each as defined above).

The polyethylene compositions disclosed herein can be made using any well-known techniques in the art, including but not limited to melt blending, solution blending, or in-reactor blending to bring together a first ethylene copolymer and a second ethylene copolymer.

In an embodiment, the polyethylene composition of the present disclosure is made using a single site catalyst in a first reactor to give a first ethylene copolymer, and a multi-site catalyst in a second reactor to give a second ethylene copolymer.

In an embodiment, the polyethylene composition of the present disclosure is made by forming a first ethylene copolymer in a first reactor by polymerizing ethylene and an α-olefin with a single site catalyst; and forming a second ethylene copolymer in a second reactor by polymerizing ethylene and an α-olefin with a multi-site catalyst.

In an embodiment, the polyethylene composition of the present disclosure is made by forming a first ethylene copolymer in a first solution phase polymerization reactor by polymerizing ethylene and an α-olefin with a single site catalyst; and forming a second ethylene copolymer in a second solution phase polymerization reactor by polymerizing ethylene and an α-olefin with a multi-site catalyst.

In an embodiment, the polyethylene composition of the present disclosure is made by forming a first ethylene copolymer in a first solution phase polymerization reactor by polymerizing ethylene and α-olefin with a single site catalyst; and forming a second ethylene copolymer in a second solution phase polymerization reactor by polymerizing ethylene and an α-olefin with a multi-site catalyst, where the first and second solution phase polymerization reactors are configured in series with one another.

In an embodiment, the polyethylene composition of the present disclosure is made by forming a first ethylene copolymer in a first solution phase polymerization reactor by polymerizing ethylene and α-olefin with a single site catalyst; and forming a second ethylene copolymer in a second solution phase polymerization reactor by polymerizing ethylene and an α-olefin with a multi-site catalyst, where the first and second solution phase polymerization reactors are configured in parallel to one another.

In embodiments, the solution phase polymerization reactor used as a first solution phase reactor is a continuously stirred tank reactor or a tubular reactor.

In an embodiment, the solution phase polymerization reactor used as a second solution phase reactor is a continuously stirred tank reactor or a tubular reactor.

In solution phase polymerization, the monomers are dissolved/dispersed in the solvent either prior to being fed to the reactor (or for gaseous monomers the monomer may be fed to the reactor so that it will dissolve in the reaction mixture). Prior to mixing, the solvent and monomers are generally purified to remove potential catalyst poisons such as water, oxygen or metal impurities. The feedstock purification follows standard practices in the art, e.g. molecular sieves, alumina beds and oxygen removal catalysts are used for the purification of monomers. The solvent itself as well (e.g. methyl pentane, cyclohexane, hexane or toluene) is preferably treated in a similar manner.

The feedstock may be heated or cooled prior to feeding to the reactor.

Generally, the catalyst components may be premixed in the solvent for the reaction or fed as separate streams to the reactor. In some instances, catalyst components premixing may be desirable to provide a reaction time for the catalyst components prior to entering the polymerization reaction zone. Such an "in line mixing" technique is well known to persons skilled in the art.

Solution polymerization processes for the polymerization or copolymerization of ethylene are well known in the art (see for example, U.S. Pat. Nos. 6,372,864 and 6,777,509). These processes are conducted in the presence of an inert hydrocarbon solvent. In a solution phase polymerization reactor, a variety of solvents may be used as the process solvent; non-limiting examples include linear, branched or cyclic $C_5$ to $C_{12}$ alkanes. Suitable catalyst component solvents include aliphatic and aromatic hydrocarbons. Non-limiting examples of aliphatic catalyst component solvents include linear, branched or cyclic $C_{5-12}$ aliphatic hydrocarbons, e.g. pentane, methyl pentane, hexane, heptane, octane, cyclohexane, cyclopentane, methylcyclohexane, hydrogenated naphtha or combinations thereof. Non-limiting examples of aromatic catalyst component solvents include benzene, toluene (methylbenzene), ethylbenzene, o-xylene (1,2-dimethylbenzene), m-xylene (1,3-dimethylbenzene), p-xylene (1,4-dimethylbenzene), mixtures of xylene isomers, hemellitene (1,2,3-trimethylbenzene), pseudocumene (1,2,4-trimethylbenzene), mesitylene (1,3,5-trimethylbenzene), mixtures of trimethylbenzene isomers, prehenitene (1,2,3,4-tetramethylbenzene), durene (1,2,3,5-tetramethylbenzene), mixtures of tetramethylbenzene isomers, pentamethylbenzene, hexamethylbenzene and combinations thereof.

In embodiments of the disclosure, the polymerization temperature in a conventional solution process may be from about 80° C. to about 300° C. In an embodiment of the disclosure the polymerization temperature in a solution process is from about 120° C. to about 250° C.

In embodiments of the disclosure, the polymerization pressure in a solution process may be a "medium pressure process", meaning that the pressure in the reactor is less than about 6,000 psi (about 42,000 kiloPascals or kPa). In embodiments of the disclosure, the polymerization pressure in a solution process may be from about 10,000 to about 40,000 kPa, or from about 14,000 to about 22,000 kPa (i.e. from about 2,000 psi to about 3,000 psi).

In embodiments of the disclosure, suitable comonomers (i.e. α-olefins) for copolymerization with ethylene in a solution phase polymerization process include $C_{3-20}$ mono- and di-olefins. In embodiments of the disclosure, comonomers which may be copolymerized with ethylene include $C_{3-12}$ α-olefins which are unsubstituted or substituted by up to two $C_{1-6}$ alkyl radicals, $C_{8-12}$ vinyl aromatic monomers which are unsubstituted or substituted by up to two substituents selected from the group consisting of $C_{1-4}$ alkyl radicals, $C_{4-12}$ straight chained or cyclic diolefins which are unsubstituted or substituted by a $C_{1-4}$ alkyl radical. In further embodiments of the disclosure, α-olefins which may be copolymerized with ethylene are one or more of propylene, 1-butene, 1-pentene, 1-hexene, 1-octene and 1-decene, styrene, alpha methyl styrene, and the constrained-ring cyclic olefins such as cyclobutene, cyclopentene, dicyclopentadiene norbornene, alkyl-substituted norbornenes, alkenyl-substituted norbornenes and the like (e.g. 5-methylene-2-norbornene and 5-ethylidene-2-norbornene, bicyclo-(2,2,1)-hepta-2,5-diene).

In an embodiment of the disclosure, the polyethylene composition comprises ethylene and one or more than one alpha olefin selected from the group comprising 1-butene, 1-hexene, 1-octene and mixtures thereof.

In an embodiment of the disclosure, the polyethylene composition comprises ethylene and one or more than one alpha olefin selected from the group comprising 1-hexene, 1-octene and mixtures thereof.

In an embodiment of the disclosure, the polyethylene composition comprises ethylene and 1-octene.

In embodiments of the disclosure, the polyethylene composition has from 0.01 to 5 mole percent of one or more than one α-olefin, including any narrower ranges within this range and any values encompassed by these ranges. For example, in embodiments of the disclosure, the polyethylene composition has from 0.05 to 5.0 mole percent of one or more than one α-olefin, or from 0.05 to 2.5 mole percent of one or more than one α-olefin, or from 0.05 to 1.5 mole percent of one or more than one α-olefin, or from 0.05 to 1.0 mole percent of one or more than one α-olefin, or from 0.1 to 2.5 mole percent of one or more than one α-olefin, or from 0.1 to 1.5 mole percent of one or more than one α-olefin, or from 0.1 to 1.0 mole percent of one or more than one α-olefin.

In embodiments of the disclosure, the polyethylene composition has from 0.05 to 5.0 mole percent of 1-octene, or from 0.05 to 2.5 mole percent of 1-octene, or from 0.05 to 1.5 mole percent of 1-octene, or from 0.05 to 1.0 mole percent of 1-octene, or from 0.1 to 2.5 mole percent of 1-octene, or from 0.1 to 1.5 mole percent of 1-octene, or from 0.10 to 1.0 mole percent of 1-octene.

In embodiments of the disclosure, the polyethylene composition that comprises a first ethylene copolymer and a second ethylene copolymer (as defined above) will have a ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) of less than 5.0, or less than 4.0, or less than 3.0, or less than 2.5, or less than 2.0.

In embodiments of the disclosure, the polyethylene composition that comprises a first ethylene copolymer and a second ethylene copolymer (as defined above) will have a ratio (SCB1/SCB2) of the number of short chain branches per thousand carbon atoms in the first ethylene copolymer (i.e., SCB1) to the number of short chain branches per thousand carbon atoms in the second ethylene copolymer (i.e., SCB2) of from 0.8 to 5.0, or from 0.8 to 3.5, or from 0.8 to 3.0, or from 1.0 to 5.0, or from 1.0 to 4.0, or from 1.0 to 3.5, or from 1.0 to 3.0, or from 1.0 to 2.8, or from 1.0 to 2.5, or from 1.0 to 2.0, or from 1.0 to 1.5, or from 0.8 to 2.8, or from 0.8 to 2.5, or from 0.8 to 2.0, or from 0.8 to 1.5, or from greater than 1.0 to 5.0, or from greater than 1.0 to 4.0, or from greater than 1.0 to 3.5, or from greater than 1.0 to 3.0, or from greater than 1.0 to 2.8, or from greater than 1.0 to 2.5.

In embodiments of the disclosure, the polyethylene composition has a weight average molecular weight, Mw of from 65,000 to 250,000 g/mol, including any narrower ranges within this range and any values encompassed by these ranges. For example, in embodiments of the disclosure, the polyethylene composition has a weight average molecular weight, Mw of from 75,000 to 200,000 g/mol, or from 65,000 to 175,000 g/mol, or from 75,000 to 150,000 g/mol, or from 65,000 to 150,000 g/mol, or from 75,000 to 125,000 g/mol, or from 65,000 to 125,000 g/mol, or from 85,000 to 125,000 g/mol, or from 90,000 to 125,000 g/mol.

In an embodiment of the disclosure, the polyethylene composition has a number average molecular weight, $M_n$ of ≤60,000 g/mol, or ≤50,000 g/mol, or <50,000 g/mol, or ≤45,000 g/mol, or <45,000 g/mol, or ≤40,000 g/mol, or <40,000 g/mol, or ≤35,000 g/mol, or <35,000 g/mol, or ≤30,000 g/mol, or <30,000 g/mol, or ≤25,000 g/mol, or <25,000 g/mol. In further embodiments of the disclosure, the polyethylene composition has a number average molecular weight, $M_n$ of from 5,000 to 60,000 g/mol, including any narrower ranges within this range and any values encompassed by these ranges. For example, in embodiments of the disclosure, the polyethylene composition has a number average molecular weight, $M_n$ of from 10,000 to 55,000 g/mol, or from 10,000 to 50,000 g/mol, or from 15,000 to 50,000 g/mol, or from 15,000 to 45,000 g/mol, or from 15,000 to 40,000 g/mol, or from 15,000 to 35,000 g/mol, or from 15,000 to 30,000 g/mol, or from 20,000 to 30,000 g/mol.

In an embodiment of the disclosure, the polyethylene composition has a Z-average molecular weight, $M_z$, of ≥250,000 g/mol, or ≥275,000 g/mol.

In further embodiments of the disclosure, the polyethylene composition has a Z-average molecular weight, $M_z$ of from 250,000 to 600,000 g/mol, including any narrower ranges within this range and any values encompassed by these ranges. For example, in embodiments of the disclosure, the polyethylene composition has a Z-average molecular weight, $M_z$ of from 250,000 to 550,000 g/mol, or from 250,000 to 500,000 g/mol or from 275,000 to 500,000 g/mol, or from 275,000 to 475,000 g/mol, or from 275,000 g/mol to 450,000 g/mol.

In an embodiment of the disclosure, the polyethylene copolymer composition has a bimodal profile (i.e. a bimodal molecular weight distribution) in a gel permeation chromatography (GPC) analysis.

In an embodiment of the disclosure, the polyethylene copolymer composition has a bimodal profile in a gel permeation chromatograph generated according to the method of ASTM D6474-99.

The term "unimodal" is herein defined to mean there will be only one significant peak or maximum evident in the GPC-curve. In contrast, the use of the term "bimodal" is meant to convey that in addition to a first peak, there will be a secondary peak or shoulder which represents a higher or lower molecular weight component (i.e. the molecular weight distribution, can be said to have two maxima in a molecular weight distribution curve). Alternatively, the term "bimodal" connotes the presence of two maxima in a molecular weight distribution curve generated according to the method of ASTM D6474-99. The term "multi-modal" denotes the presence of two or more, typically more than two, maxima in a molecular weight distribution curve generated according to the method of ASTM D6474-99.

In embodiments of the disclosure, the polyethylene composition has a molecular weight distribution, $M_w/M_n$ of ≤8.0, or <8.0, or ≤7.0, or <7.0, or ≤6.5, or <6.5, or ≤6.0, or <6.0, or 5.5, or <5.5, or ≤5.0, or <5.0. In embodiments of the disclosure, the polyethylene composition has a molecular weight distribution, $M_w/M_n$ of ≥3.0, >3.0, or ≥3.5, or >3.5.

In embodiments of the disclosure, the polyethylene composition has a molecular weight distribution, $M_w/M_n$ of from 2.9 to 8.0, including any narrower ranges within this range and any values encompassed by these ranges. For example, in embodiments of the disclosure, the polyethylene composition has a molecular weight distribution, $M_w/M_n$ of from 2.9 to 7.5, or from 3.0 to 7.0, or from 3.0 to 6.5, or from 3.0 to 6.0, or from 3.5 to 7.0 or from 3.5 to 6.5, or from 3.5 to 6.0, or from 3.5 to 5.5, or from 3.5 to 5.0, or from 3.0 to 6.5, or from 3.0 to 6.0, or from 3.0 to 5.5, or from 3.0 to 5.0.

In embodiments of the disclosure, the polyethylene composition has a Z-average molecular weight distribution, Mz/Mw of ≥2.5, or ≥2.6, or ≥2.7, or ≥2.8, or >2.5, or >2.6, or >2.7, or >2.8.

In embodiments of the disclosure, the polyethylene composition has a Z-average molecular weight distribution, Mz/Mw of from 2.5 to 4.5 including any narrower ranges within this range and any values encompassed by these ranges. For example, in embodiments of the disclosure, the polyethylene composition has a Z-average molecular weight distribution, Mz/Mw of from 2.5 to 4.0, or from 2.7 to 4.0, or from 2.8 to 4.0, or from 2.5 to 3.8, or from 2.5 to 3.5, or from 2.8 to 3.8, or from 2.8 to 3.5.

In embodiments of the disclosure, the polyethylene copolymer composition has a density of ≥0.940 g/cm$^3$, or ≥0.941 g/cm$^3$, or ≥0.942 g/cm$^3$, or ≥0.943 g/cm$^3$.

In embodiments of the disclosure, the polyethylene composition has a density of from 0.940 to 0.970 g/cm$^3$, including any narrower ranges within this range and any values encompassed by these ranges. For example, in embodiments of the disclosure, the polyethylene composition has a density of from 0.940 to 0.965 g/cm$^3$, or from 0.941 to 0.965 g/cm$^3$, or from 0.940 to 0.962 g/cm$^3$, or from 0.941 to 0.962 g/cm$^3$, or from 0.941 to 0.960 g/cm$^3$, or from 0.941 to 0.957 g/cm$^3$, or from 0.941 to 0.954 g/cm$^3$, or from 0.941 to 0.952 g/cm$^3$, or from 0.940 to 0.960 g/cm$^3$, or from 0.940 to 0.957 g/cm$^3$, or from 0.940 to 0.954 g/cm$^3$, or from 0.940 to 0.952 g/cm$^3$, or from 0.942 to 0.954 g/cm$^3$, or from 0.942 to 0.952 g/cm$^3$.

In embodiments of the disclosure, the polyethylene composition has a melt index, $I_2$ of from 0.001 to 5.0 g/10 min, including any narrower ranges within this range and any values encompassed by these ranges. For example, in embodiments of the disclosure, the melt index, $I_2$ of the polyethylene composition may be from 0.01 to 5.0 g/10 min, or from 0.1 to 5.0 g/10 min, or from 0.01 to 4.0 g/10 min, or from 0.1 to 4.0 g/10 min 0.01 to 2.5 g/10 min, or from 0.1 to 2.5 g/10 min, or from 0.5 to 5.0 g/10 min, or 0.8 to 5.0 g/10 min, or from 0.5 to 4.0 g/10 min, or from 0.8 to 4.0 g/10 min, or from 0.5 to 2.5 g/10 min, or from 0.8 to 2.5 g/10 min, or from 0.5 to 2.0 g/10 min, or from 0.8 to 2.0 g/10 min.

In embodiments of the disclosure the polyethylene composition has a high load melt index, $I_{21}$ of at least 55 g/10 min, or at least 60 g/10 min, or at least 65 g/10 min, or at least 70 g/10 min. In further embodiments of the disclosure, the polyethylene composition has a high load melt index, $I_{21}$ of from 55 to 160 g/10 min, including any narrower ranges within this range and any values encompassed by these ranges. For example, in embodiments of the disclosure, the high load melt index, $I_{21}$ of the polyethylene composition may be from 55 to 120 g/10 min, or from 60 to 120 g/10 min In embodiments of the disclosure the polyethylene composition has a melt flow ratio, $I_{21}/I_2$ of ≥35, or >35, or ≥40, or >40, or ≥45, or >45. In further embodiments of the disclosure the polyethylene composition has a melt flow ratio, $I_{21}/I_2$ of from 35 to 120, including any narrower ranges within this range and any values encompassed by these ranges. For example, in embodiments of the disclosure, the polyethylene composition has a melt flow ratio, $I_{21}/I_2$ of from 40 to 100, or from 45 to 100, or from 40 to 90, or from 45 to 90.

In an embodiment of the disclosure, the polyethylene composition will have a reverse or partially reverse comonomer distribution profile as measured using GPC-FTIR.

In an embodiment of the disclosure, the polyethylene composition will have an approximately flat (or uniform) comonomer distribution profile as measured using GPC-FTIR.

If the comonomer incorporation decreases as molecular weight increases, as measured using GPC-FTIR, the distribution is described as "normal". If the comonomer incorporation is approximately constant with molecular weight, as measured using GPC-FTIR, the comonomer distribution is described as "flat" or "uniform". The terms "reverse comonomer distribution" and "partially reverse comonomer distribution" mean that in the GPC-FTIR data obtained for a copolymer, there is one or more higher molecular weight components having a higher comonomer incorporation than in one or more lower molecular weight components. The term "reverse(d) comonomer distribution" is used herein to mean, that across the molecular weight range of an ethylene copolymer, comonomer contents for the various polymer fractions are not substantially uniform and the higher molecular weight fractions thereof have proportionally higher comonomer contents (i.e. if the comonomer incorporation rises with molecular weight, the distribution is described as "reverse" or "reversed"). Where the comonomer incorporation rises with increasing molecular weight and then declines, the comonomer distribution is still considered "reverse", but may also be described as "partially reverse". A partially reverse comonomer distribution will exhibit a peak or maximum.

In embodiments of the disclosure, the $CDBI_{50}$ of the polyethylene composition will be greater than 50 weight %, or greater than 55 wt %, or greater than 60 wt %, or greater than 65 wt %, or greater than 70 wt %, or greater than 75 wt %. In embodiments of the disclosure, the $CDBI_{50}$ of the polyethylene composition will be from 60 to 98 weight %, or from 70 to 90 wt %, or from 75 to 85 wt %.

In embodiments of the disclosure, the upper limit on the parts per million (ppm) of hafnium in the polyethylene composition (parts per million of Hf, based on the weight of the polyethylene composition) may be about 3.0 ppm, or about 2.5 ppm, or about 2.4 ppm, or about 2.0 ppm, or about 1.5 ppm, or about 1.0 ppm, or about 0.75 ppm, or about 0.5 ppm. In embodiments of the disclosure, the lower limit on the parts per million (ppm) of hafnium in the polyethylene composition may be about 0.0015 ppm, or about 0.0050 ppm, or about 0.0075 ppm, or about 0.010 ppm, or about 0.015 ppm, or about 0.030 ppm, or about 0.050 ppm, or about 0.075 ppm, or about 0.100 ppm, or about 0.150 ppm, or about 0.175 ppm, or about 0.200 ppm.

In embodiments of the disclosure, the polyethylene composition has from 0.0015 to 2.4 ppm of hafnium, or from 0.0050 to 2.4 ppm of hafnium, or from 0.0075 to 2.4 ppm of hafnium, or from 0.010 to 2.4 ppm of hafnium, or from 0.015 to 2.4 ppm of hafnium, or from 0.050 to 3.0 ppm of hafnium, or from 0.050 to 2.4 ppm, or from 0.050 to 2.0 ppm, or from 0.050 to 1.5 ppm, or from 0.050 to 1.0 ppm, or from 0.050 to 0.75 ppm, or from 0.075 to 2.4 ppm of hafnium, or from 0.075 to 2.0 ppm of hafnium, or from 0.075 to 1.5 ppm of hafnium, or from 0.075 to 1.0 ppm of hafnium, or from 0.075 to 0.75 ppm of hafnium, or from 0.100 to 2.0 ppm of hafnium, or from 0.100 to 1.5 ppm of hafnium, or from 0.100 to 1.0 ppm of hafnium, or from 0.100 to 0.75 ppm of hafnium.

In embodiments of the disclosure, the polyethylene composition has at least 0.0015 ppm of hafnium, or at least 0.005 ppm of hafnium, or at least 0.0075 ppm of hafnium, or at least 0.015 ppm of hafnium, or at least 0.030 ppm of hafnium, or at least 0.050 ppm of hafnium, or at least 0.075 ppm of hafnium, or at least 0.100 ppm of hafnium, or at least 0.125 ppm of hafnium, or at least 0.150 ppm of hafnium, or at least 0.175 ppm of hafnium, or at least 0.200 ppm of hafnium, or at least 0.300 ppm of hafnium, or at least 0.350 ppm of hafnium.

In an embodiment of the disclosure, the polyethylene composition contains long chain branching characterized by the long chain branching factor, LCBF disclosed herein. In embodiments of the disclosure, the upper limit on the LCBF of the polyethylene composition may be 0.5000, or 0.4000, or 0.3000 (dimensionless). In embodiments of the disclosure, the lower limit on the LCBF of the polyethylene composition may be 0.0010, or 0.0015, or 0.0020, or 0.0100, or 0.0500, or 0.1000 (dimensionless).

In embodiments of the disclosure, the LCBF of the polyethylene composition is at least 0.0010, or at least 0.0020, or at least 0.0050, or at least 0.0070, or at least 0.0100, or at least 0.0200, or at least 0.0250.

In embodiments of the disclosure, the LCBF of the polyethylene composition may be >0.0010, or >0.0050, or >0.0100, or >0.0200 (dimensionless).

In embodiments of the disclosure, the LCBF of the polyethylene composition may be from 0.0010 to 0.5000, or from 0.0010 to 0.1000, or from 0.0050 to 0.5000, or from 0.0050 to 0.1000, or from 0.0070 to 0.5000, or from 0.0050 to 0.2500, or from 0.0070 to 0.2500, or from 0.0100 to 0.5000, or from 0.0100 to 0.2500, or from 0.0050 to 0.1000, or from 0.0070 to 0.1000, or from 0.0100 to 0.1000, or from 0.0050 to 0.1500, or from 0.0070 to 0.1500, or from 0.0100 to 0.1500.

In an embodiment of the disclosure, the polyethylene composition has a stress exponent, defined as $Log_{10}[I_6/I_2]/Log_{10}[6.48/2.16]$, which is ≥1.40. In further embodiments of the disclosure the polyethylene composition has a stress exponent, $Log_{10}[I_6/I_2]/Log_{10}[6.48/2.16]$ of greater than 1.42, or greater than 1.45, or greater than 1.50.

In embodiments of the disclosure, the polyethylene composition has a stress exponent, defined as $Log_{10}[I_6/I_2]/Log_{10}[6.48/2.16]$, which is from 1.45 to 1.80, or from 1.50 to 1.80, or from 1.50 to 1.75.

In an embodiment of the disclosure, the polyethylene composition has a fraction eluting at greater than 90° C., having an integrated area of greater than 65 weight percent, in a temperature rising elution fractionation (TREF) analysis as obtained using a CTREF instrument (a "CRYSTAF/Temperature Rising Elution Fractionation" instrument). In an embodiment of the disclosure, the polyethylene composition has a fraction eluting at greater than 90° C., having an integrated area of greater than 70 weight percent, in a temperature rising elution fractionation (TREF) analysis as obtained using a CTREF instrument (a "CRYSTAF/Temperature Rising Elution Fractionation" instrument). In an embodiment of the disclosure, the polyethylene composition has a fraction eluting at greater than 90° C., having an integrated area of greater than 75 weight percent, in a temperature rising elution fractionation (TREF) analysis as obtained using a CTREF instrument (a "CRYSTAF/Temperature Rising Elution Fractionation" instrument).

In an embodiment of the disclosure, the polyethylene composition has a fraction eluting at from 90 to 98° C., having an integrated area of greater than 50 weight percent, in a temperature rising elution fractionation (TREF) analysis as obtained using a CTREF instrument (a "CRYSTAF/Temperature Rising Elution Fractionation instrument). In an embodiment of the disclosure, the polyethylene composition has a fraction eluting at from 90 to 98° C., having an integrated area of greater than 60 weight percent, in a temperature rising elution fractionation (TREF) analysis as obtained using a CTREF instrument (a "CRYSTAF/Temperature Rising Elution Fractionation" instrument). In an embodiment of the disclosure, the polyethylene composition has a fraction eluting at from 90 to 98° C., having an integrated area of greater than 70 weight percent, in a temperature rising elution fractionation (TREF) analysis as obtained using a CTREF instrument (a "CRYSTAF/Temperature Rising Elution Fractionation" instrument). In an embodiment of the disclosure, the polyethylene composition has a fraction eluting at from 90 to 98° C., having an integrated area of greater than 75 weight percent, in a temperature rising elution fractionation (TREF) analysis as obtained using a CTREF instrument (a "CRYSTAF/Temperature Rising Elution Fractionation" instrument).

Additives can be added to the polyethylene composition during an extrusion or compounding step, but other suitable known methods will be apparent to a person skilled in the art. The additives can be added as is or as part of a separate polymer component (i.e., not the first or second ethylene polymers described above) added during an extrusion or compounding step. Suitable additives are known in the art and include but are not-limited to antioxidants, phosphites and phosphonites, nitrones, antacids, UV light stabilizers, UV absorbers, metal deactivators, dyes, fillers and reinforcing agents, nano-scale organic or inorganic materials, antistatic agents, lubricating agents such as calcium stearates, slip additives such as erucimide, and nucleating agents (including nucleators, pigments or any other chemicals which may provide a nucleating effect to the polyethylene composition). The additives that can be optionally added are typically added in amount of up to 20 weight percent (wt %).

One or more nucleating agent(s) may be introduced into the polyethylene composition by kneading a mixture of the polymer, usually in powder or pellet form, with the nucleating agent, which may be utilized alone or in the form of a concentrate containing further additives such as stabilizers, pigments, antistatics, UV stabilizers and fillers. It should be a material which is wetted or absorbed by the polymer, which is insoluble in the polymer and of melting point higher than that of the polymer, and it should be homogeneously dispersible in the polymer melt in as fine a form as possible (1 to 10 μm). Compounds known to have a nucleating capacity for polyolefins include salts of aliphatic monobasic or dibasic acids or arylalkyl acids, such as sodium succinate or aluminum phenylacetate; and alkali metal or aluminum salts of aromatic or alicyclic carboxylic acids such as sodium β-naphthoate. Another compound known to have nucleating capacity is sodium benzoate. The effectiveness of nucleation may be monitored microscopically by observation of the degree of reduction in size of the spherulites into which the crystallites are aggregated.

Examples of nucleating agents which are commercially available and which may be added to the polyethylene composition are dibenzylidene sorbital esters (such as the products sold under the trademark MILLAD® 3988 by Milliken Chemical and IRGACLEAR® by Ciba Specialty Chemicals). Further examples of nucleating agents which may added to the polyethylene composition include the cyclic organic structures disclosed in U.S. Pat. No. 5,981,636 (and salts thereof, such as disodium bicyclo [2.2.1] heptene dicarboxylate); the saturated versions of the structures disclosed in U.S. Pat. No. 5,981,636 (as disclosed in U.S. Pat. No. 6,465,551; Zhao et al., to Milliken); the salts of certain cyclic dicarboxylic acids having a hexahydrophthalic acid structure (or "HHPA" structure) as disclosed in U.S. Pat. No. 6,599,971 (Dotson et al., to Milliken); and phosphate esters, such as those disclosed in U.S. Pat. No. 5,342,868 and those sold under the trade names NA-11 and NA-21 by Asahi Denka Kogyo, cyclic dicarboxylates and the salts thereof, such as the divalent metal or metalloid salts, (particularly, calcium salts) of the HHPA structures disclosed in U.S. Pat. No. 6,599,971. For clarity, the HHPA structure generally comprises a ring structure with six carbon atoms in the ring and two carboxylic acid groups which are substituents on adjacent atoms of the ring structure. The other four carbon atoms in the ring may be substituted, as disclosed in U.S. Pat. No. 6,599,971. An example is 1,2-cyclohexanedicarboxylicacid, calcium salt (CAS registry number 491589-22-1). Still further examples of nucleating agents which may added to the polyethylene composition include those disclosed in WO2015042561, WO2015042563, WO2015042562 and WO 2011050042.

Many of the above described nucleating agents may be difficult to mix with the polyethylene composition that is being nucleated and it is known to use dispersion aids, such as for example, zinc stearate, to mitigate this problem.

In an embodiment of the disclosure, the nucleating agents are well dispersed in the polyethylene composition.

In an embodiment of the disclosure, the amount of nucleating agent used is comparatively small (from 5 to 3000 parts by million per weight (based on the weight of the polyethylene composition)) so it will be appreciated by those skilled in the art that some care must be taken to ensure that the nucleating agent is well dispersed. In an embodiment of the disclosure, the nucleating agent is added in finely divided form (less than 50 microns, especially less than 10 microns) to the polyethylene composition to facilitate mixing. This type of "physical blend" (i.e., a mixture of the nucleating agent and the resin in solid form) may, in some embodiments, be preferable to the use of a "masterbatch" of the nucleator (where the term "masterbatch" refers to the practice of first melt mixing the additive—the nucleator, in this case—with a small amount of the polyethylene composition resin—then melt mixing the "masterbatch" with the remaining bulk of the polyethylene composition resin).

In an embodiment of the disclosure, an additive such as nucleating agent may be added to the polyethylene composition by way of a "masterbatch", where the term "masterbatch" refers to the practice of first melt mixing the additive (e.g., a nucleator) with a small amount of the polyethylene composition, followed by melt mixing the "masterbatch" with the remaining bulk of the polyethylene composition.

In an embodiment of the disclosure, the polyethylene composition further comprises a nucleating agent or a mixture of nucleating agents.

The Biaxial Orientation Process

In an embodiment of the disclosure, a biaxially oriented polyethylene film or biaxially oriented polyethylene film structure comprises a polyethylene composition made according to the present disclosure A biaxially oriented polyethylene (BOPE) film or film structure may in an embodiment of the disclosure be made using a tenter frame process.

The tenter frame process is commonly used to prepare biaxially oriented film and is suitable for use in embodiments of the present disclosure. The tenter frame process is well known to persons skilled in the art of film making. The process begins with an extruder that is equipped with a slot die to form a sheet or film. For convenience, this extruded sheet or film may be referred to as the "base film" or "base film structure" or "base structure". Once the base structure has been quenched on chill rolls, it is re-heated and machine direction (MD) stretching or machine direction orientation (MDO) is accomplished by pulling the base structure using several closely spaced rolls that rotate with progressively increasing surface speeds. Following MD stretching, clips (that are attached to chains) grip the edges of the moving sheet (or film, or web) and carry it into an oven. In the oven, the edges of the base structure are drawn apart making the sheet wider, thus providing transverse direction orientation (TDO). The orientation/stretching causes the film structure to become thinner, proportionally to the orientation or stretch ratios. For example, to prepare a 1-mil finished BOPE film with a 5:1 stretch ratio in the machine direction (MD) and a 8:1 stretch ratio in the transverse direction (TD), the process may start out with a 40-mil thick film or sheet.

In embodiments of the disclosure, the stretch ratio in the machine direction (MD) may range from about 5:1 to about 9:1 while the stretch ratio in the transverse direction (TD) may range from about 7:1 to 12:1. In other embodiments of the disclosure, the stretch ratio in the machine direction (MD) may range from about 3:1 to about 12:1 while the stretch ratio in the transverse direction (TD) may range from about 3:1 to 12:1. In still other embodiments of the disclosure, the stretch ratio in the machine direction (MD) may range from about 5:1 to about 12:1 while the stretch ratio in the transverse direction (TD) may range from about 5:1 to 12:1. In yet still other embodiments of the disclosure, the stretch ratio in the machine direction (MD) may range from about 3:1 to about 10:1 while the stretch ratio in the transverse direction (TD) may range from about 3:1 to 10:1.

Further details of a biaxial orientation processes are provided by Kanai T., et al. in the textbook "Film Processing Advances" (2014), Hanser Publishers, but generally a sequential biaxial orientation process will include: cast extruding a relatively thick base film structure from a slot die followed by cooling on a chill (or with a water bath); stretching the base film structure in the machine direction using heated rollers which rotate at gradually increasing speeds; stretching the film structure in the transverse direction by pulling each edge of the film structure with clips attached to the edge of the film structure, and where as the clips pull the film forward they move farther apart to pull the edges of the gripped film in the cross direction (i.e. stretching occurs in the transverse direction which is perpendicular to the machine direction); passage through an oven to anneal the film structure; optional surface treatment of the film structure; trimming away the unstretched edges of the film structure which are held by the clips; and winding of the film structure.

Although sequential biaxially stretching is employed in embodiments of the present disclosure, sequential biaxially orientation may in some embodiments lead to film quality issues. For example, the optics of a film or multilayer film structure may be compromised in some embodiments. Hence, for certain embodiments, an alternative unit operation may be preferable, which involves simultaneous machine direction/transverse direction stretching in a single process step. During simultaneous stretching, a base film may be held by tenter clips (as described above) and suspended in the air while being stretched in both the MD and TD directions.

In an embodiment, the polyethylene composition made according to the present disclosure is used to make a BOPE film or film structure.

In an embodiment, a BOPE film or film structure is made with from 60 to 100 weight % (based on the total weight of the film or film structure) of the polyethylene composition made according to the present disclosure. In an embodiment, a BOPE film or film structure is made with from 70 to 90 weight % (based on the total weight of the film or film structure) of the polyethylene composition made according to the present disclosure. In an embodiment, a BOPE film or film structure is made with from 80 to 95 weight % (based on the total weight of the film or film structure) of the polyethylene composition made according to the present disclosure.

In an embodiment, an "all polyethylene" BOPE film or film structure is made with at least 90 weight % (based on the weight of polymeric material used in the film or film structure) of the polyethylene composition described herein. In an embodiment, an "all polyethylene" BOPE film or film structure is made with at least 95 weight % (based on the weight of polymeric material used in the film or film structure) of the polyethylene composition described herein. In an embodiment, an "all polyethylene" BOPE film or film structure is made with at least 99 weight % (based on the weight of polymeric material used in the film or film structure) of the polyethylene composition described herein. In an embodiment, an "all polyethylene" BOPE film or film structure is made with 100 weight % (based on the weight of polymeric material used in the film or film structure) of the polyethylene composition described herein.

In an embodiment, a BOPE film or film structure is made with from 60 to 100 weight % (based on the total weight of the film or film structure) of the polyethylene composition made according to the present disclosure, while the remaining polymer(s) used to prepare the BOPE film or film structure is also a polyethylene. In an embodiment, a BOPE film or film structure is made with from 70 to 90 weight % (based on the total weight of the film or film structure) of the polyethylene composition made according to the present disclosure while the remaining polymer(s) used to prepare the BOPE film or film structure is also a polyethylene. In an embodiment, a BOPE film or film structure is made with from 80 to 95 weight % (based on the total weight of the film or film structure) of the polyethylene composition made according to the present disclosure while the remaining polymer(s) used to prepare the BOPE film or film structure is also a polyethylene. Without wishing to be bound by theory, use of only polyethylene to prepare a BOPE film or film structure allows the film to be more easily recycled in comparison to a film made with a mixture of polymers.

It is known in the art of preparing BOPE films to use blends of polymers and this is also contemplated in certain embodiments of the present disclosure. Hence, in an embodiment of the disclosure, a BOPE film or film structure is prepared from a polymer blend composition comprising at least 60 weight % of the polyethylene composition made according to the present disclosure.

Some non-limiting examples of other polymers which in embodiments of the disclosure are suitable for use in blends with the polyethylene composition include: Linear Low Density Polyethylene (LLDPE); Medium Density Polyethylene (MDPE); High Density Polyethylene (HDPE); Very Low Density Polyethylene (VLDPE), including elastomers and plastomers; and High Pressure Low Density Polyethylene (HPLDPE) which is prepared by the free radical polymerization of ethylene.

In embodiments of the disclosure, a LLDPE used in a polymer blend with the polyethylene composition has a melt index ($I_2$) of from 0.1 to 10 g/10 min, or from 0.9 to 2.3 g/10 min, and a density of from about 0.910 to about 0.935 g/cm$^3$.

In embodiments of the disclosure, a VLPDE used in a polymer blend with the polyethylene composition has a melt index ($I_2$) of from 0.1 to 10 g/10 min, or from 0.9 to 2.3 g/10 min, and a density of from about 0.890 to about 0.910 g/cm$^3$.

In embodiments of the disclosure, a MDPE used in a polymer blend with the polyethylene composition has a melt index ($I_2$) of from 0.1 to 10 g/10 min, or from 0.9 to 2.3 g/10 min, and a density of from about 0.936 to about 0.949 g/cm$^3$.

In embodiments of the disclosure, a HDPE used in a polymer blend with the polyethylene composition has a melt index ($I_2$) of from 0.1 to 10 g/10 min, or from 0.4 to 0.9 g/10 min and a density of at least about 0.95 g/cm$^3$.

In an embodiment of the disclosure, a HPLDPE used in a polymer blend with the polyethylene composition has a melt index ($I_2$) of from 0.1 to 10 g/10 min and a density of from about 0.92 to about 0.94 g/cm$^3$.

It is known in the art of preparing BOPE films to use a multi-layer film or film structure as the (unstretched) starting film. These starting films are comparatively thick before being stretched and are often referred to as a "sheet" instead of a film. For convenience, such an unstretched, multi-layer sheet may be referred to as a "base film" or "base film structure" or "base structure".

In an embodiment of the disclosure a suitable base film structure will comprise at least 60 weight % of the polyethylene composition made as described herein (based on the total weight of the base film structure).

In an embodiment of the disclosure, the polyethylene composition made as described herein is used as a "core" layer in a suitable base film structure (i.e. as interior layer of a multi-layer base film structure). In embodiments of the disclosure, polymers that may be used to prepare other layers in a suitable base film structure include the LLDPE; MDPE, HDPE; VLPDE and HPLDPE described above.

In an embodiment of the disclosure, the multi-layer base film structure contains at least three layers including two skin layers (i.e. the layers on each exterior surface of the base film structure) and one or more core layers.

In an embodiment of the disclosure, one skin layer may be made from HDPE while the other skin layer is a seal layer, as disclosed in published U.S. Pat. No. 9,676,169.

In an embodiment of the disclosure, the seal layer may comprise: a linear low density polyethylene, LLDPE (such as for example a LLDPE made with a so called metallocene catalyst, which are well known to persons skilled in the art); a plastomer; an elastomer; or blends thereof.

In an embodiment, a plastomer comprising polymerized ethylene and 1-octene monomers (and blends thereof with a LLDPE, a HDPE and/or HPLDPE) may also be used in a seal layer.

In an embodiment of the disclosure, it is also contemplated to use a plastomer (or polymer blends thereof) in both skin layers of a BOPE film.

Without wishing to be bound by theory, the use of plastomers in a skin layer may improve the optical properties of a BOPE film.

In an embodiment of the disclosure, a BOPE film has a core layer comprising the polyethylene composition made as described herein while both skin layers comprise a plastomer comprising polymerized ethylene and 1-octene monomers.

In an embodiment of the disclosure, a BOPE film has a core layer comprising the polyethylene composition made as described herein while both skin layers also comprise a polyethylene composition made as described herein.

In an embodiment of the disclosure, a BOPE film or film structure comprises at least three layers and each layer comprises the polyethylene composition made as described herein.

In an embodiment of the disclosure, a BOPE film or film structure comprises at least three adjacent layers and each layer comprises the polyethylene composition described herein.

In an embodiment of the disclosure, a BOPE film or film structure comprises at least three layers and each layer comprises: i) from 50 to 99 weight percent of the polyethylene composition described herein; and ii) 50 to 1 weight percent of a polyethylene selected from the group comprising LLDPE; MDPE, HDPE; VLPDE and HPLDPE.

In an embodiment of the disclosure, a multilayer structure that contains at least 5 layers has two external skin layers made from a plastomer and two "adjacent-to-skin" layers that are made from a blend of a plastomer and a polyethylene having a higher density than the plastomer.

It is known to use a layer of a "barrier resin" to improve the barrier properties of BOPE films. Non-limiting examples of suitable barrier resins include Ethylene-Vinyl Alcohol (EVOH) and polyamide.

In an embodiment of the disclosure a surface of a BOPE film or film structure is metallized.

In an embodiment of the disclosure, a surface of a BOPE film or film structure is metallized after being surface treated.

In a metallization process, a BOPE film may be placed inside a vacuum chamber for physical vapor deposition (PVD) metallization using a source of metal such as for example the metal per se, or a metal oxide. The physical vapor deposition metallization process adds a metal layer to a surface layer of a film or film structure by heating a metal or a metal containing substrate to high temperature under vacuum. In PVD metallization, evaporation of the metal or metal containing substrate occurs followed by condensation of the metal or metal containing substrate onto the surface of the film or film structure. Metals which can be added to a BOPE film using vapor deposition metallization, include for example, aluminum, titanium, vanadium, chromium, manganese, iron, cobalt, silver, nickel, copper, zinc, gold, and palladium, or mixtures thereof. In embodiments of the disclosure, the thickness of the metallized layer (i.e. the deposited metal layer) can be from 100 to 5000 Angstrom, or from 300 to 3000 Angstrom.

In an embodiment of the disclosure, a surface of a BOPE film or film structure is metallized by physical vapor deposition (PVD) metallization with aluminum.

The polymers used in the present disclosure (including the polyethylene composition made as described herein) will in specific embodiments contain an antioxidant (such as a hindered phenol; a phosphite or a blend of both) in conventional amounts, as is well known to those skilled in the art. Other, optional additives which can be added to a polymer (including the polyethylene composition made as described herein) in specific embodiments include anti-blocking agents, slip agents and nucleating agents (such as those disclosed in U.S. Pat. No. 9,676,169). The use of zinc glycerolate as an optional nucleating agent is also contemplated for use in specific embodiments of the disclosure (note: the zinc glycerolate nucleating agent is commercially available, under the trademark IRGASTAB® 287).

In an embodiment of the disclosure, a surface of a BOPE film or film structure is surface treated. Without wishing to be bound by theory, surface treatment may render a surface more suitable for, or receptive to metallization, coatings, printing inks, adhesives, and/or lamination.

In embodiments of the disclosure, a surface of a BOPE film or film structure is surface treated by treatment with corona discharge radiation, flame or polarized flame, plasma, or chemicals.

The BOPE films prepared according to this disclosure may be suitable for use in a wide variety of packaging applications. In an embodiment, the BOPE film may be used in a laminated structure—for example, the BOPE film may be used as the print web when laminated to a sealant web made from a lower density polyethylene. This type of laminated structure may be more easily recycled in comparison to conventional laminated structures that contain a layer of polyester or polypropylene that is laminated to a layer of polyethylene.

The following examples are presented for the purpose of illustrating selected embodiments of this disclosure; it being understood, that the examples presented do not limit the claims presented.

EXAMPLES

Polymer Characterization and Test Methods

Prior to testing, each polymer specimen was conditioned for at least 24 hours at 23±2° C. and 50±10% relative humidity and subsequent testing was conducted at 23±2° C. and 50±10% relative humidity. Herein, the term "ASTM conditions" refers to a laboratory that is maintained at 23±2° C. and 50±10% relative humidity; and specimens to be tested were conditioned for at least 24 hours in this laboratory prior to testing. ASTM refers to the American Society for Testing and Materials.

Density

Polymer densities were determined using ASTM D792-13 (Nov. 1, 2013).

Melt Index

Polymer melt index was determined using ASTM D1238 (Aug. 1, 2013). Melt indexes, $I_2$, $I_6$, $I_{10}$ and $I_{21}$ were measured at 190° C., using weights of 2.16 kg, 6.48 kg, 10 kg and a 21.6 kg respectively. Herein, the term "stress exponent" or its acronym "S.Ex.", is defined by the following relationship:

$$S.Ex. = \log\left(I_6/I_2\right)/\log(6480/2160)$$

wherein $I_6$ and $I_2$ are the melt flow rates measured at 190° C. using 6.48 kg and 2.16 kg loads, respectively. In this disclosure, melt index was expressed using the units of g/10 minutes or g/10 min or dg/minutes or dg/min; these units are equivalent.

Neutron Activation (Elemental Analysis)

Neutron Activation Analysis, hereinafter N.A.A., was used to determine catalyst metal residues in polymers as follows. A radiation vial (composed of ultrapure polyethylene, 7 mL internal volume) was filled with a polyethylene composition sample and the sample weight was recorded. Using a pneumatic transfer system the sample was placed inside a SLOWPOKE™ nuclear reactor (Atomic Energy of Canada Limited, Ottawa, Ontario, Canada) and irradiated for 30 to 600 seconds for short half-life elements (e.g., Ti, V, Al, Mg, and Cl) or 3 to 5 hours for long half-life elements (e.g. Zr, Hf, Cr, Fe and Ni). The average thermal neutron flux within the reactor was $5\times10^{11}$/cm²/s. After irradiation, samples were withdrawn from the reactor and aged, allowing the radioactivity to decay; short half-life elements were aged for 300 seconds or long half-life elements were aged for several days. After aging, the gamma-ray spectrum of the sample was recorded using a germanium semiconductor gamma-ray detector (Ortec model GEM55185, Advanced Measurement Technology Inc., Oak Ridge, TN, U.S.A.) and a multichannel analyzer (Ortec model DSPEC Pro). The amount of each element in the sample was calculated from the gamma-ray spectrum and recorded in parts per million relative to the total weight of the polyethylene composition sample. The N.A.A. system was calibrated with Specpure standards (1000 ppm solutions of the desired element (greater than 99% pure)). One mL of solutions (elements of interest) were pipetted onto a 15 mm×800 mm rectangular paper filter and air dried. The filter paper was then placed in a 1.4 mL polyethylene irradiation vial and analyzed by the N.A.A. system. Standards are used to determine the sensitivity of the N.A.A. procedure (in counts/μg).

Gel Permeation Chromatography (GPC)

Polyethylene composition sample (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Polymer solutions were chromatographed at 140° C. on a PL 220 high-temperature chromatography unit equipped with four Shodex columns (HT803, HT804, HT805 and HT806) using TCB as the mobile phase with a flow rate of 1.0 mL/minute, with a differential refractive index (DRI) as the concentration detector. BHT was added to the mobile phase at a concentration of 250 ppm to protect GPC columns from oxidative degradation. The sample injection volume was 200 μL. The GPC columns were calibrated with narrow distribution polystyrene standards. The polystyrene molecular weights were converted to polyethylene molecular weights using the Mark-Houwink equation, as described in the ASTM standard test method D6474-12 (December 2012). The GPC raw data were processed with the CIRRUS® GPC software, to produce molar mass averages ($M_n$, $M_w$, $M_z$) and molar mass distribution (e.g. Polydispersity, $M_w/M_n$). In the polyethylene art, a commonly used term that is equivalent to GPC is SEC, i.e. Size Exclusion Chromatography.

Triple Detection Size Exclusion Chromatography (3D-SEC)

Polyethylene composition samples (polymer) solutions (1 to 3 mg/mL) were prepared by heating the polymer in 1,2,4-trichlorobenzene (TCB) and rotating on a wheel for 4 hours at 150° C. in an oven. An antioxidant (2,6-di-tert-butyl-4-methylphenol (BHT)) was added to the mixture in order to stabilize the polymer against oxidative degradation. The BHT concentration was 250 ppm. Sample solutions were chromatographed at 140° C. on a PL 220 high-temperature chromatography unit equipped with a differential refractive index (DRI) detector, a dual-angle light scattering detector (15 and 90 degree) and a differential viscometer. The SEC columns used were either four Shodex columns (HT803, HT804, HT805 and HT806), or four PL Mixed ALS or BLS columns. TCB was the mobile phase with a flow rate of 1.0 mL/minute, BHT was added to the mobile phase at a concentration of 250 ppm to protect SEC columns from oxidative degradation. The sample injection volume was 200 μL. The SEC raw data were processed with the CIRRUS GPC software, to produce absolute molar masses and intrinsic viscosity ([η]). The term "absolute" molar mass was used to distinguish 3D-SEC determined absolute molar masses from the molar masses determined by conventional SEC. The viscosity average molar mass (My) determined by 3D-SEC was used in the calculations to determine the Long Chain Branching Factor (LCBF).

GPC-FTIR

Polyethylene compositions (polymer) solutions (2 to 4 mg/mL) were prepared by heating the polymer in 1,2,4-trichlorobenzene (TCB) and rotating on a wheel for 4 hours at 150° C. in an oven. The antioxidant 2,6-di-tert-butyl-4-methylphenol (BHT) was added to the mixture in order to stabilize the polymer against oxidative degradation. The BHT concentration was 250 ppm. Sample solutions were chromatographed at 140° C. on a Waters GPC 150C chromatography unit equipped with four Shodex columns (HT803, HT804, HT805 and HT806) using TCB as the mobile phase with a flow rate of 1.0 mL/minute, with a FTIR spectrometer and a heated FTIR flow through cell coupled with the chromatography unit through a heated transfer line as the detection system. BHT was added to the mobile phase at a concentration of 250 ppm to protect SEC columns from oxidative degradation. The sample injection volume was 300 μL. The raw FTIR spectra were processed with OPUS FTIR software and the polymer concentration and methyl content were calculated in real time with the Chemometric Software (PLS technique) associated with the OPUS. Then the polymer concentration and methyl content were acquired and baseline-corrected with the CIRRUS GPC software. The SEC columns were calibrated with narrow distribution polystyrene standards. The polystyrene molecular weights were converted to polyethylene molecular weights using the Mark-Houwink equation, as described in the ASTM standard test method D6474. The comonomer content was calculated based on the polymer concentration and methyl content predicted by the PLS technique as described in Paul J. DesLauriers, Polymer 43, pages 159-170 (2002); herein incorporated by reference.

Short Chain Branching—GPC-FTIR

Short chain branches per 1000 carbon atoms, is measured relative to the copolymer fractions of different molecular weights. When plotted on a semi-logarithmic scale graph, the sloping line (from low molecular weight fractions to high molecular weight fractions on the logarithmic horizontal X-axis and the number of short chain branches on the vertical y-axis) is the short chain branching distribution determined by Fourier Transform Infra-Red (FTIR) spectrometry for the different molecular weight fractions. The GPC-FTIR method measures total methyl content, which includes the methyl groups located at the ends of each macromolecular chain, i.e. methyl end groups. Thus, the raw GPC-FTIR data must be corrected by subtracting the contribution from methyl end groups. To be more clear, the raw GPC-FTIR data overestimates the amount of short chain branching (SCB) and this overestimation increases as molecular weight (M) decreases. In this disclosure, raw GPC-FTIR data was corrected using the 2-methyl correction. At a given molecular weight (M), the number of methyl end groups ($N_E$) was calculated using the following equation: $N_E$=28000/M, and $N_E$ (M dependent) was subtracted from the raw GPC-FTIR data to produce the SCB/1000C (2-Methyl Corrected) GPC-FTIR data.

Unsaturation Content

The quantity of unsaturated groups, i.e., double bonds, in a polyethylene composition was determined according to ASTM D3124-98 (vinylidene unsaturation, published March 2011) and ASTM D6248-98 (vinyl and trans unsaturation, published July 2012). An ethylene interpolymer sample was: a) first subjected to a carbon disulfide extraction to remove additives that may interfere with the analysis; b) the sample (pellet, film or granular form) was pressed into a plaque of uniform thickness (0.5 mm); and c) the plaque was analyzed by FTIR.

Comonomer Content: Fourier Transform Infrared (FTIR) Spectroscopy

The quantity of comonomer in a polyethylene composition was determined by FTIR and reported as the Short Chain Branching (SCB) content having dimensions of $CH_3$ #/1000C (number of methyl branches per 1000 carbon atoms). This test was completed according to ASTM D6645-01 (2001), employing a compression molded polymer plaque and a Thermo-Nicolet 750 Magna-IR Spectrophotometer. The polymer plaque was prepared using a compression molding device (Wabash-Genesis Series press) according to ASTM D4703-16 (April 2016).

Differential Scanning Calorimetry (DSC)

DSC testing was conducted in general accordance with ASTM D3418. This analysis is performed by subjecting a polymer sample (5-10 mg prepared in an aluminum pan) and a reference material (empty aluminum pan) to a constant rate of temperature change within the DSC cell. The actual temperatures of the sample and reference are monitored by the instrument as the sample temperature is increased or decreased linearly with time. If the sample undergoes a transition, reaction, or transformation, the rate at which its temperature changes will differ from that of the reference. The instrument (TA Instruments Q2000) was first calibrated with indium; after the calibration, a polymer specimen is equilibrated at 0° C. and then the temperature was increased to 200° C. at a heating rate of 10° C./min; the melt was then kept isothermally at 200° C. for five minutes; the melt was then cooled to 0° C. at a cooling rate of 10° C./min and kept at 0° C. for five minutes; the specimen was then heated to 200° C. at a heating rate of 10° C./min. The difference in temperature between the sample and reference (DT=Treference−Tsample) is then plotted against the sample temperature to produce a differential thermogram. From this plot, the melting peak temperatures (° C.), enthalpy of fusion (J/g) and crystallinity (%) was determined.

Dynamic Mechanical Analysis (DMA)

Oscillatory shear measurements under small strain amplitudes were carried out to obtain linear viscoelastic functions at 190° C. under $N_2$ atmosphere, at a strain amplitude of 10% and over a frequency range of 0.02-126 rad/s at 5 points per decade. Frequency sweep experiments were performed with a TA Instruments DHR3 stress-controlled rheometer using cone-plate geometry with a cone angle of 5°, a truncation of 137 μm and a diameter of 25 mm. In this experiment a sinusoidal strain wave was applied and the stress response was analyzed in terms of linear viscoelastic functions. The zero shear rate viscosity ($\eta_0$) based on the DMA frequency sweep results was predicted by Ellis model (see R. B. Bird et al. "Dynamics of Polymer Liquids. Volume 1: Fluid Mechanics" Wiley-Interscience Publications (1987) p.228) or Carreau-Yasuda model (see K. Yasuda (1979) PhD Thesis, IT Cambridge).

The shear thinning index, $SHI_{(0.5,50)}$ was calculated as the ratio of the complex viscosities estimated at shear stress of 0.5 kPa over that estimated at a shear stress of 50 kPa. The shear thinning index, $SHI_{(0.5,50)}$ provides information on the shear thinning behavior of the polymer melt. A high value indicates a strong dependence of viscosity with changes in deformation rate (shear or frequency).

In this disclosure, the LCBF (Long Chain Branching Factor) was determined using the DMA determined $\eta_0$ (see U.S. Pat. No. 10,442,921).

Capillary Rheology

Rheological data obtained from the DYNISCO® LCR7000 capillary rheometer was used for obtaining the viscosity profiles at different shear rates for different resins. In the capillary extrusion rheometer, the material is held in a temperature-controlled barrel and forced through an accurately dimensioned die by a piston. Bore dimensions, die dimensions and the piston speed determine the apparent rate of shear being applied to the material, and the force and die dimensions are used to calculate the apparent shear stress. The shear viscosity can be obtained from capillary flow method using the Poiseuille's Law:

$$\sigma_S = \left(\frac{PR}{2L}\right)$$

$$\frac{\partial\gamma}{\partial t} = (4Q)(\pi R^3)$$

where P=pressure drop across the capillary ($N/m^2$); R=radius of capillary (m); L=length of the capillary (m); Q=volumetric flow rate ($m^3$/sec); $\sigma_s$=apparent shear stress; $\delta\gamma/(\delta t)$=apparent shear rate.

The shear rate, shear stress and shear viscosity determined using the Poiseuille's equation are normally referred to as an apparent shear viscosity, shear stress and shear rate. This is due to fact that the non-Newtonian character of most fluids, and the pressure drop across the die entry and exit pressure are not taken into consideration. The test temperature was set up at 200° C. The length of the capillary used was 30.48 mm and the die diameter was 1.524 mm in this evaluation.

Melt Strength

The melt strength is measured on Rosand RH-7 capillary rheometer (barrel diameter=15 mm) with a flat die of 2-mm Diameter, L/D ratio 10:1 at 190° C. Pressure Transducer: 10,000 psi (68.95 MPa). Piston Speed: 5.33 mm/min. Haul-off Angle: 52°. Haul-off incremental speed: 50-80 m/$min^2$ or 65±15 m/$min^2$. A polymer melt is extruded through a capillary die under a constant rate and then the polymer strand is drawn at an increasing haul-off speed until it ruptures. The maximum steady value of the force in the plateau region of a force versus time curve is defined as the melt strength for the polymer.

Vicat Softening Point (Temperature)

The Vicat softening point of a polyethylene composition sample was determined according to ASTM D1525-07 (published December 2009). This test determines the temperature at which a specified needle penetration occurs when samples are subjected to ASTM D1525-07 test conditions, i.e., heating Rate B (120±10° C./hr and 938 gram load (10±0.2N load).

CYTSAF/TREF (CTREF)

The "Composition Distribution Breadth Index", hereinafter CDBI, of the polyethylene composition (and Comparative Examples) was measured using a CRYSTAF/TREF 200+ unit equipped with an IR detector, hereinafter the CTREF. The acronym "TREF" refers to Temperature Rising Elution Fractionation. The CTREF was supplied by Polymer Characterization, S. A. (Valencia Technology Park, Gustave Eiffel, 8, Paterna, E-46980 Valencia, Spain). The CTREF was operated in the TREF mode, which generates the chemical composition of the polymer sample as a function of elution temperature, the Co/Ho ratio (Copolymer/Homopolymer ratio) and the CDBI (the Composition Distribution Breadth Index), i.e. $CDBI_{50}$ and $CDBI_{25}$. A polymer sample (80 to 100 mg) was placed into the reactor vessel of the CTREF. The reactor vessel was filled with 35 ml of 1,2,4-trichlorobenzene (TCB) and the polymer was dissolved by heating the solution to 150° C. for 2 hours. An aliquot (1.5 mL) of the solution was then loaded into the CTREF column which was packed with stainless steel beads. The column, loaded with sample, was allowed to stabilize at 110° C. for 45 minutes. The polymer was then crystallized from solution, within the column, by dropping the temperature to 30° C. at a cooling rate of 0.09° C./minute. The column was then equilibrated for 30 minutes at 30° C. The crystallized polymer was then eluted from the column with TCB flowing through the column at 0.75 mL/minute, while the column was slowly heated from 30° C. to 120° C. at a heating rate of 0.25° C./minute. The raw CTREF data were processed using Polymer Char software, an Excel spreadsheet and CTREF software developed in-house. $CDBI_{50}$ was defined as the percent of polymer whose composition is within 50% of the median comonomer composition; $CDBI_{50}$ was calculated from the composition distribution cure and the normalized cumulative integral of the composition distribution curve, as described in U.S. Pat. No. 5,376,439. Those skilled in the art will understand that a calibration curve is required to convert a CTREF elution temperature to comonomer content, i.e. the amount of comonomer in the ethylene/α-olefin polymer fraction that elutes at a specific temperature. The generation of such calibration curves are described in the prior art, e.g. Wild, et al., J. Polym. Sci., Part B, Polym. Phys., Vol. 20 (3), pages 441-455: hereby fully incorporated by reference. $CDBI_{25}$ as calculated in a similar manner; $CDBI_{25}$ is defined as the percent of polymer whose composition is with 25% of the median comonomer composition. At the end of each sample run, the CTREF column was cleaned for 30 minutes; specifically, with the CTREF column temperature at 160° C., TCB flowed (0.5 mL/minute) through the column for 30 minutes.

The CTREF procedures described above are well known to persons skilled in the art and can be used to determine the modality of a TREF profile, a $CDBI_{50}$, a $CDBI_{25}$, the amount of material (in weight percent) in a polyethylene composition which elutes at above 90° C. (i.e. the relative area of an eluted fraction occurring in the TREF profile at 90° C. and above), the amount of material (in weight percent) in a polyethylene composition which elutes at a temperature of from 90° C. to 98° C. (i.e. the relative area of an eluted fraction occurring in the TREF profile at from 90° C. to 98° C.) as well as the temperatures or temperature ranges where elution intensity maxima (elution peaks) occur.

Long Chain Branching Factor (LCBF)

The LCBF (dimensionless) was determined for the polyethylene composition using the method described in U.S. Pat. No. 10,442,921 which is incorporated herein by reference.

The long chain branching factor (the "LCBF") calculation requires the polydispersity corrected Zero Shear Viscosity ($ZSV_c$) and the short chain branching (the "SCB") corrected Intrinsic Viscosity ($IV_c$) as fully described in the following paragraphs.

The correction to the Zero Shear Viscosity, $ZSV_c$, having dimensions of poise, was performed as shown in equation Eq. (1):

$$ZSV_c = \frac{1.8389 \times \eta_0}{2.4110^{Ln(Pd)}} \quad \text{Eq.(1)}$$

where $\eta_0$, the zero shear viscosity (poise), was measured by DMA as described above; Pd was the dimensionless polydispersity ($M_w/M_n$) as measured using conventional GPC as described above and 1.8389 and 2.4110 are dimensionless constants.

The correction to the Intrinsic Viscosity, $IV_c$, having dimensions of dL/g, was performed as shown in equation Eq. (2):

$$IV_c = [\eta] + \frac{A \times SCB \times M_v^{0.725}}{1000000} \quad \text{Eq.(2)}$$

where the intrinsic viscosity [η] (dL/g) was measured using 3D-SEC described above; the SCB has dimensions of ($CH_3$ #/1000C) and was determined using FTIR as described above; $M_v$, the viscosity average molar mass (g/mole), was determined using 3D-SEC as described above, and A was a dimensionless constant that depends on the α-olefin in the ethylene/α-olefin copolymer sample, i.e. A was 2.1626, 1.9772 or 1.1398 for 1-octene, 1-hexene and 1-butene α-olefins, respectively. In the case of an ethylene homopolymer no correction is required for the Mark-Houwink constant, i.e. SCB is zero.

"Linear" ethylene copolymers (or linear ethylene homopolymers), which do not contain LCB or contain undetectable levels of LCB, fall on the Reference Line defined by Eq. (3).

$$\text{Log}(IV_c) = 0.2100 \times \text{Log}(ZSV_c) - 0.7879 \quad \text{Eq. (3)}$$

The calculation of the LCBF was based on the Horizontal-Shift ($S_h$) and Vertical-Shift ($S_v$) from the linear reference line, as defined by the following equations:

$$S_h = \text{Log}(ZSV_c) - 4.7619 \times \text{Log}(IV_c) - 3.7519 \quad \text{Eq.(4)}$$

$$S_v = 0.2100 \times \text{Log}(ZSV_c) - \text{Log}(IV_c) - 0.7879. \quad \text{Eq.(5)}$$

In Eq. (4) and (5), it is required that $ZSV_c$ and $IV_c$ have dimensions of poise and dL/g, respectively. The Horizontal-Shift ($S_h$) was a shift in $ZSV_c$ at constant Intrinsic Viscosity ($IV_c$), if one removes the Log function its physical meaning is apparent, i.e. a ratio of two Zero Shear Viscosities, the $ZSV_c$ of the sample under test relative to the $ZSV_c$ of a linear ethylene copolymer (or a linear ethylene homopolymer) having the same $IV_c$. The Horizontal-Shift ($S_h$) was dimensionless. The Vertical-Shift ($S_v$) was a shift in $IV_c$ at constant Zero Shear Viscosity ($ZSV_c$), if one removes the Log function its physical meaning is apparent, i.e. a ratio of two Intrinsic Viscosities, the $IV_c$ of a linear ethylene copolymer (or a linear ethylene homopolymer) having the same $ZSV_c$ relative to the $IV_c$ of the sample under test. The Vertical-Shift ($S_v$) was dimensionless.

The dimensionless Long Chain Branching Factor (LCBF) was defined by Eq. (6):

$$LCBF = \frac{S_h \times S_v}{2} \quad \text{Eq.(6)}$$

In an embodiment of the disclosure, ethylene polymers (e.g. polyethylene compositions) having LCB are characterized as having a LCBF≥0.0010 (dimensionless); in contrast, ethylene polymers having no LCB (or undetectable LCB) are characterized by a LCBF of less than 0.0010 (dimensionless).

Hexane Extractables

Hexane extractables was determined according to the Code of Federal Registration 21 CFR § 177.1520 Para (c) 3.1 and 3.2; wherein the quantity of hexane extractable material in a sample is determined gravimetrically.

Film Opticals

Film optical properties (of the base unstretched multilayer precursor films as well as the stretched multilayer films) were measured as follows: Haze, ASTM D1003-13 (Nov. 15, 2013), and Gloss 45, ASTM D2457-13 (Apr. 1, 2013).

Film Elmendorf Tear

Film tear performance (of the base unstretched multilayer precursor films as well as the stretched multilayer films) was determined by ASTM D1922-09 (May 1, 2009); an equivalent term for tear is "Elmendorf tear". Film tear was measured in both the machine direction (MD) and the transverse direction (TD) of the blown films.

Film Mechanical Properties

Tensile tests in both machine and transverse directions (MD and TD, respectively) were conducted in general compliance with ASTM D882 (ASTM D882-10 and ASTM D882-12). The width of the specimen used for the tensile property measurement was 1.0 inch. The stretching speed is 1 mm/min to 5% Strain and then the speed was increased to 100 mm/min until break. The grip separation was 100 mm. Mechanical properties measured are tensile break stress (reported in MPa), strain at yield (%), yield stress (MPa), strain at break (%), break stress (MPa). The 1 and 2% secant modulus (MPa) were measured using 1.0 inch wide specimens, 2 inch grip separation at a test speed of 1.0 inch/min.

Film Thermal Shrinkage (%)

Shrinkage of the film was measured using 10×10 cm film specimens that were placed in an oven in air, for 5 min at 120° C. The relative decrease in length in the machine and transverse directions of the heated film compared to the original film is reported as percent shrinkage. (%) Shrinkage=$(L_{initial}-L_{final})/L_{initial}$ where $L_{initial}$ and $L_{final}$ are the length before and after thermal treatment.

Film Puncture Resistance

Film puncture resistance (of the base unstretched precursor multilayer films as well as the stretched multilayer films)

was measured in terms of the Film Puncture (J/mm) according to the ASTM D5748-95. The film displacement was recorded against the force (1*b*) and the maximum force was reported as the Puncture Force at Break (1*b*) in accordance with the ASTM D5748-95.

Film Thickness

Film thickness for the base unstretched precursor multilayer films and the stretched multilayer films were measured according to ASTM D 6988-13.

Preparation of Polyethylene Compositions

Polyethylene compositions were made using a mixed dual catalyst system in an "in-series" dual reactor solution polymerization process. As a result, polyethylene compositions comprised a first ethylene copolymer made with a single site catalyst and a second ethylene copolymer made with a multi-site catalyst. An "in series" dual reactor, solution phase polymerization process, including one employing a mixed dual catalyst has been described in U.S. Pat. Appl. Pub. No. 2018/0305531. Basically, in an "in-series" dual reactor system the exit stream from a first polymerization reactor (R1) flows directly into a second polymerization reactor (R2). The R1 pressure was from about 14 MPa to about 18 MPa; while R2 was operated at a lower pressure to facilitate continuous flow from R1 to R2. Both R1 and R2 were continuously stirred reactors (CSTR's) and were agitated to give conditions in which the reactor contents were well mixed. The process was operated continuously by feeding fresh process solvent, ethylene, 1-octene and hydrogen to the reactors and in the removal of product. Note that in the inventive examples, fresh 1-octene is fed to both the first and second reactors, R1 and R2 (indeed, for Inv. Examples 1-3 more 1-octene is fed to the second reactor than to the first reactor). Methylpentane was used as the process solvent (a commercial blend of methylpentane isomers). The volume of the first CSTR reactor (R1) was 3.2 gallons (12 L), and the volume of the second CSTR reactor (R2) was 5.8 gallons (22 L). Monomer (ethylene) and comonomer (1-octene) were purified prior to addition to the reactor using conventional feed preparation systems (such as contact with various absorption media to remove impurities such as water, oxygen and polar contaminants). The reactor feeds were pumped to the reactors at the ratios shown in Table 1. Average residence times for the reactors are calculated by dividing average flow rates by reactor volume and is primarily influenced by the amount of solvent flowing through each reactor and the total amount of solvent flowing through the solution process.

In the first reactor, R1, the following single site catalyst components were used to prepare the first ethylene copolymer: diphenylmethylene(cyclopentadienyl)(2,7-di-t-butylfluorenyl)hafnium dimethide [(2,7-$tBu_2Flu)Ph_2C(Cp)HfMe_2$]; methylaluminoxane (MMAO-07); trityl tetrakis (pentafluoro-phenyl)borate (trityl borate), and 2,6-di-tert-butyl-4-ethylphenol (BHEB). Methylaluminoxane (MMAO-07) and 2,6-di-tert-butyl-4-ethylphenol are premixed in-line and then combined with diphenylmethylene (cyclopentadienyl)(2,7-di-t-butylfluorenyl)hafnium dimethide and trityl tetrakis(pentafluoro-phenyl)borate just before entering the polymerization reactor (R1). The efficiency of the single site catalyst formulation was optimized by adjusting the mole ratios of the catalyst components and the R1 catalyst inlet temperature.

The following Ziegler-Natta (ZN) catalyst components were used to prepare the second ethylene copolymer in the second reactor, R2: butyl ethyl magnesium; tertiary butyl chloride; titanium tetrachloride; diethyl aluminum ethoxide; and triethyl aluminum. Methylpentane was used as the catalyst component solvent and the in-line Ziegler-Natta catalyst formulation was prepared using the following steps and then injected into the second reactor (R2). In step one, a solution of triethylaluminum and butyl ethyl magnesium (Mg:Al=20, mol:mol) was combined with a solution of tertiary butyl chloride and allowed to react for about 30 seconds to produce a $MgCl_2$ support. In step two, a solution of titanium tetrachloride was added to the mixture formed in step one and allowed to react for about 14 seconds prior to injection into second reactor (R2). The in-line Ziegler-Natta catalyst was activated in the reactor by injecting a solution of diethyl aluminum ethoxide into R2. The quantity of titanium tetrachloride added to the reactor is shown in Table 1. The efficiency of the in-line Ziegler-Natta catalyst formulation was optimized by adjusting the mole ratios of the catalyst components.

Polymerization in the continuous solution polymerization process was terminated by adding a catalyst deactivator to the second reactor exit stream. The catalyst deactivator used was octanoic acid (caprylic acid), commercially available from P&G Chemicals, Cincinnati, OH, U.S.A. The catalyst deactivator was added such that the moles of fatty acid added were 50% of the total molar amount of hafnium, titanium and aluminum added to the polymerization process; to be clear, the moles of octanoic acid added=0.5×(moles hafnium+moles titanium+moles aluminum).

A two-stage devolatilization process was employed to recover the ethylene interpolymer product from the process solvent, i.e. two vapor/liquid separators were used and the second bottom stream (from the second V/L separator) was passed through a gear pump/pelletizer combination. DHT-4V (hydrotalcite), supplied by Kyowa Chemical Industry Co. Ltd., Tokyo, Japan was used as a passivator, or acid scavenger, in the continuous solution process. A slurry of DHT-4V in process solvent was added prior to the first V/L separator.

Prior to pelletization the polyethylene composition was stabilized by adding about 500 ppm of IRGANOX® 1076 (a primary antioxidant) and about 500 ppm of IRGAFOS® 168 (a secondary antioxidant), based on weight of the polyethylene composition. Antioxidants were dissolved in process solvent and added between the first and second V/L separators.

Table 1 shows the reactor conditions used to make inventive polyethylene compositions (Inv. Examples 1-3) as well as the conditions used to make a comparative polyethylene composition (Comp. Example 4). Table 1 includes process parameters, such as the ethylene and 1-octene splits between the reactors (R1 and R2), the reactor temperatures, the ethylene conversions, etc. As can be seen from the data provided in Table 1, the so called "octene split" used for making the inventive polyethylene ethylene compositions, included fresh 1-octene being fed to both reactors, with more 1-octene being fed to the second reactor, R2. This is in contrast to the polymerization conditions used to make the comparative polyethylene composition (Comp. Example 4), where 1-octene was fed only to the first reactor (note: although no co-monomer is fed directly to the downstream second reactor, R2 when making Comp. Example 4, an ethylene copolymer is nevertheless formed in second reactor due to the significant presence of un-reacted 1-octene flowing from the first reactor to the second reactor where it is copolymerized with ethylene). For Inv. Examples 1-3, the hydrogen levels and temperature of the first reactor, R1 were optimized to produce a first ethylene copolymer having a weight average molecular weight, Mw of greater than about 170,000 g/mol, while the hydrogen levels and temperature of the second reactor, R2, were optimized to produce a second ethylene copolymer having a weight average molecular weight, Mw of less than about 50,000 g/mol.

The properties of polyethylene compositions produced according to the present disclosure, Inv. Examples 1-3 are provided in Table 2. Table 2 also includes data for a comparative polyethylene composition, Comp. Example 4.

TABLE 1

| Polymerization Conditions | | | | |
|---|---|---|---|---|
| Example No. | Example 1 (Inventive) | Example 2 (Inventive) | Example 3 (Inventive) | Example 4 (Comparative) |
| Catalyst in R1 | Metallocene | Metallocene | Metallocene | Metallocene |
| Catalyst in R2 | ZielgerNatta | ZielgerNatta | ZielgerNatta | ZielgerNatta |
| Total Solution Rate (TSR) (kg/h) | 500.0 | 500.0 | 500.0 | 500 |
| Ethylene Concentration (wt % overall) | 16.3 | 16.2 | 16.3 | 16.5 |
| 1-Octene to Ethylene Ratio Total | 0.068 | 0.09 | 0.07 | 0.025 |
| Ethylene split between First Reactor (R1) and Second Reactor (R2) | 30/70 | 30/70 | 30/70 | 30/70 |
| 1-Octene split between First Reactor (R1) and Second Reactor (R2) | 10/90 | 13/87 | 10/90 | 100/0 |
| Ethylene Fresh Feed to R1 Concentration (wt %) | 11.4 | 13.4 | 9.7 | 10.9 |
| 1-Octene/ethylene in R1 Fresh Feed (g/g) | 0.02 | 0.04 | 0.02 | 0.08 |
| Ethylene Fresh Feed to R2 Concentration (wt %) | 20.05 | 17.85 | 23.01 | 21.16 |
| 1-Octene/ethylene in R2 Fresh Feed (g/g) | 0.09 | 0.11 | 0.09 | 0 |
| Hydrogen in Reactor 1 (ppm) | 2.5 | 3.0 | 4.0 | 3 |
| Hydrogen in Reactor 2 (ppm) | 60.0 | 38.0 | 38.0 | 70 |
| Reactor 1 Inlet Temperature (° C.) | 30.0 | 30.0 | 30.0 | 25 |
| Reactor 2 Inlet Temperature (° C.) | 30.0 | 30.0 | 30.0 | 30 |
| Reactor 1 Temperature (° C.) | 151.5 | 170.0 | 133.5 | 143 |
| Reactor 2 Temperature (° C.) | 215.0 | 215.0 | 215.0 | 215.0 |
| Ethylene Conversion in Reactor 1 (%) | 80.0 | 80.0 | 80.0 | 80 |
| Ethylene Conversion in Reactor 2 (%) | 93.2 | 94.2 | 93.7 | 95.1 |
| Catalyst Feed in R1 - SSC Molecule (ppm Hf) | 0.31 | 0.34 | 0.24 | 0.22 |
| SSC - Al/Hf (mol/mol) | 60 | 60 | 60 | 60 |
| SSC - BHEB/Al (mol/mol) | 0.2 | 0.2 | 0.2 | 0.2 |
| SSC - B/Hf (mol/mol) | 1.31 | 1.31 | 1.31 | 1.53 |
| Catalyst Feed in R2 (Titanium tetrachloride, $TiCl_4$ in ppm) | 4.50 | 4.46 | 4.85 | 4.73 |
| ZN - tert-tert-Butyl chloride / Butyl(ethyl)magnesium in R2 (mol/mol) | 1.92 | 1.92 | 1.92 | 2.00 |
| ZN - Diethylaluminium ethoxide / $TiCl_4$ in R2 (mol/mol) | 1.35 | 1.35 | 1.35 | 1.35 |
| ZN - Triethylaluminium / $TiCl_4$ in R2 (mol/mol) | 0.37 | 0.37 | 0.37 | 0.37 |
| ZN - Butyl(ethyl)magnesium / $TiCl_4$ in R2 (mol/mol) | 7.4 | 7.4 | 7.4 | 7.4 |
| Polyethylene Production Rate (kg/h) | 78.4 | 78.7 | 78.7 | 80.4 |

TABLE 2

| Polymer Properties | | | | |
|---|---|---|---|---|
| Example No. | Example 1 (Inventive) | Example 2 (Inventive) | Example 3 (Inventive) | Example 4 (Comparative) |
| Density (g/cm$^3$) | 0.9498 | 0.945 | 0.9468 | 0.9529 |
| Melt Index $I_2$ (g/10 min) | 0.96 | 1.57 | 1.12 | 1.24 |
| Melt Index $I_6$ (g/10 min) | 6.49 | 8.56 | 6.02 | 8.62 |
| Melt Index $I_{10}$ (g/10 min) | 24.99 | 31.42 | 21.98 | 19.4 |
| Melt Index $I_{21}$ (g/10 min) | 76.49 | 72.82 | 56.84 | 108 |

TABLE 2-continued

| Polymer Properties | | | | |
|---|---|---|---|---|
| Example No. | Example 1 (Inventive) | Example 2 (Inventive) | Example 3 (Inventive) | Example 4 (Comparative) |
| Melt Flow Ratio ($I_{21}/I_2$) | 80.1 | 46.4 | 51 | 86.7 |
| Stress Exponent | 1.74 | 1.54 | 1.53 | 1.77 |
| Melt Flow Ratio ($I_{10}/I_2$) | 26 | 20 | 19.7 | 16.0 |
| CTREF | | | | |
| CTREF - Weight Fraction greater than 90° C. | 83 | 79 | 84 | 67 |
| CTREF - Weight Fraction of from 90° C. to 98° C. | 82 | 81 | 83.3 | 29 |
| CTREF - $CDBI_{50}$ | 81.9 | 79.7 | 77.8 | 38.4 |
| FTIR | | | | |
| Branch Freq/1000 C | 2.2 | 3.1 | 2.3 | 2.2 |
| Comonomer ID | 1-octene | 1-octene | 1-octene | 1-octene |
| Comonomer Content (mole %) | 0.4 | 0.6 | 0.5 | 0.4 |
| Comonomer Content (wt %) | 1.7 | 2.4 | 1.8 | 1.7 |
| Internal Unsat/100 C | 0.002 | 0.003 | 0.001 | 0.001 |
| Side Chain Unsat/100 C | 0.001 | 0.002 | 0.001 | 0 |
| Terminal Unsat/100 C | 0.049 | 0.05 | 0.05 | 0.048 |
| GPC | | | | |
| $M_n$ | 23596 | 26937 | 23871 | 15,456 |
| $M_w$ | 114373 | 98255 | 98777 | 91,397 |
| $M_z$ | 392159 | 300093 | 288792 | 315,664 |
| Polydispersity Index ($M_w/M_n$) | 4.85 | 3.65 | 4.14 | 5.91 |
| $M_z/M_w$ | 3.429 | 3.054 | 2.92 | 3.45 |
| Mean Melt Strength - 190° C. (cN) | 4.35 | 3.75 | 4.11 | 3.5 |
| Mean Stretch Ratio - 190° C. (%) | 399.4 | 537.6 | 520.3 | 475.9 |
| Rheo-Ro - Dynamic Frequency Sweep | | | | |
| Zero Shear Viscosity - 190° C. (Pa-s) | 33549 | 15618 | 16692 | 11147 |
| Shear Thinning Index SHI (0.5, 50) | 7.23 | 4.92 | 4.93 | 3.52 |
| Hexane Extractables (%) - Plaque | 0.07 | 0.16 | 0.15 | 0.1 |
| Long Chain Branching Factor, LCBF | 0.0648 | 0.0569 | 0.0205 | 0.0475 |

Polyethylene Composition Modeling

For the multicomponent polyethylene compositions, the $M_w$, $M_n$, and $M_w/M_n$ of the first and second ethylene copolymers were calculated herein (see the results provided in Table 3), by using a reactor model simulation using the input conditions which were employed for the actual pilot scale polymerization run conditions (for references on relevant reactor modeling methods, see "Copolymerization" by A. Hamielec, J. MacGregor, and A. Penlidis in *Comprehensive Polymer Science and Supplements*, volume 3, Chapter 2, page 17, Elsevier, 1996 and "Copolymerization of Olefins in a Series of Continuous Stirred-Tank Slurry-Reactors using Heterogeneous Ziegler-Natta and Metallocene Catalysts. I. General Dynamic Mathematical Model" by J. B. P Soares and A. E Hamielec in *Polymer Reaction Engineering*, 4(2&3), p153, 1996.)

The model takes for input the flow of several reactive species (e.g. catalyst, monomer such as ethylene, comonomer such as 1-octene, hydrogen, and solvent) going to each reactor, the temperature (in each reactor), and the conversion of monomer (in each reactor), and calculates the polymer properties (of the polymer made in each reactor, i.e., the first and second ethylene copolymers) using a terminal kinetic model for continuously stirred tank reactors (CSTRs) connected in series. The "terminal kinetic model" assumes that the kinetics depend upon the monomer unit within the polymer chain on which the active catalyst site is located (see "Copolymerization" by A. Hamielec, J. MacGregor, and A. Penlidis in *Comprehensive Polymer Science and Supplements*, Volume 3, Chapter 2, page 17, Elsevier, 1996). In the model, the copolymer chains are assumed to be of reasonably large molecular weight to ensure that the statistics of monomer/comonomer unit insertion at the active catalyst center is valid and that monomers/comonomers consumed in routes other than propagation are negligible. This is known as the "long chain" approximation.

The terminal kinetic model for polymerization includes reaction rate equations for activation, initiation, propagation, chain transfer, and deactivation pathways. This model solves the steady-state conservation equations (e.g., the total mass balance and heat balance) for the reactive fluid which comprises the reactive species identified above.

The total mass balance for a generic continuously stirred tank reactor, CSTR with a given number of inlets and outlets is given by:

$$0 = \sum_i \dot{m}_i \quad (1)$$

where $\dot{m}_i$ represents the mass flow rate of individual streams with index i indicating the inlet and outlet streams.

Equation (1) can be further expanded to show the individual species and reactions:

$$0 = \frac{\sum_i \dot{m} x_{i,j} / M_i}{\rho_{mix} V} + R_j / \rho_{mix} \quad (2)$$

where $M_i$ is the average molar weight of the fluid inlet or outlet (i), $x_{ij}$ is the mass fraction of species j in stream i, $\rho_{mix}$ is the molar density of the reactor mixture, V is the reactor volume, $R_j$ is the reaction rate for species j, which has units of kmol/m$^3$s.

The total heat balance is solved for an adiabatic reactor and is given by:

$$0=\left(\sum \dot{m}_i \Delta H_i + q_{Rx} V + \dot{W} - \dot{Q}\right) \quad (3)$$

where, $\dot{m}_i$ is the mass flow rate of stream i (inlet or outlet), $\Delta H_i$ is the difference in enthalpy of stream i versus a reference state, $q_{Rx}$ is the heat released by reaction(s), V is the reactor volume, $\dot{W}$ is the work input (i.e., agitator), $\dot{Q}$ is the heat input/loss.

The catalyst concentration input to each reactor is adjusted to match the experimentally determined ethylene conversion and reactor temperature values in order solve the equations of the kinetic model (e.g., propagation rates, heat balance and mass balance).

The $H_2$ concentration input to each reactor may be likewise adjusted so that the calculated molecular weight distribution of a polymer made over both reactors (and, hence, the molecular weight of polymer made in each reactor) matches that which is observed experimentally.

The weight fraction, wt1 and wt2 of material made in each reactor, R1 and R2, is determined from knowing the mass flow of monomer and comonomer into each reactor along with knowing the conversions for monomer and comonomer in each reactor calculated based on kinetic reactions.

The degree of polymerization ($dp_n$) for a polymerization reaction is given by the ratio of the rate of chain propagation reactions over the rate of chain transfer/termination reactions:

$$dp_n = \frac{k_{p11}\phi_1[m_1] + k_{p12}\phi_1[m_2] + k_{p21}\phi_2[m_1] + k_{p22}\phi_2[m_2]}{k_{tm11}\phi_1[m_1] + k_{tm12}\phi_2[m_2] + k_{tm21}\phi_2[m_1] + k_{tm22}\phi_2[m_2] + k_{ts1}\phi_1 + k_{ts2}\phi_2 + k_{tH1}[H] + k_{tH2}[H]} = \frac{R_p}{R_t} \quad (4)$$

Where $k_{p11}$ is the propagation rate constant for adding monomer 1 to a growing polymer chain ending with monomer 1, $[m_1]$ is the molar concentration of monomer 1 (ethylene) in the reactor, $k_{p12}$ is the propagation rate constant for adding monomer 2 to a growing polymer chain ending with monomer 1, $k_{p21}$ is the propagation rate constant for adding monomer 1 to a growing polymer chain ending with monomer 2, $[m_2]$ is the molar concentration of monomer 2 (1-octene) in the reactor, $k_{p22}$ is the propagation rate constant for adding monomer 2 to a growing polymer chain ending with monomer 2, $k_{tm11}$ the termination rate constant for chain transfer to monomer 1 for a growing chain ending with monomer 1, $k_{tm12}$ the termination rate constant for chain transfer to monomer 2 for a growing chain ending with monomer 1, $k_{tm21}$ the termination rate constant for chain transfer to monomer 1 for a growing chain ending with monomer 2, $k_{tm22}$ the termination rate constant for chain transfer to monomer 2 for a growing chain ending with monomer 2, $k_{ts1}$ is rate constant for the spontaneous chain termination for a chain ending with monomer 1, $k_{ts2}$ is rate constant for the spontaneous chain termination for a chain ending with monomer 2, $k_{tH1}$ is the rate constant for the chain termination by hydrogen for a chain ending with monomer 1, $k_{tH2}$ is the rate constant for the chain termination by hydrogen for a chain ending with monomer 2. $\phi_1$ and $\phi_2$ and the fraction of catalyst sites occupied by a chain ending with monomer 1 or monomer 2 respectively.

The number average molecular weight (Mn) for a polymer follows from the degree of polymerization and the molecular weight of a monomer unit. From the number average molecular weight of polymer in a given reactor, and assuming a Flory-Schulz distribution for a single site catalyst, the molecular weight distribution is determined for the polymer using the following relationships.

$$w(n) = n\tau^2 e^{-\tau n} \quad (5)$$

where n is the number of monomer units in a polymer chain, w(n) is the weight fraction of polymer chains having a chain length n, and $\tau$ is calculated using the equation:

$$\tau = \frac{1}{dp_n} = \frac{R_t}{R_p}$$

where $dp_n$ is the degree of polymerization, $R_p$ is the rate of propagation and $R_t$ is the rate of termination.

The Flory-Schulz distribution can be transformed into the common log scaled GPC trace by applying:

$$\frac{dW}{d\log(M)} = \ln(10)\frac{n^2}{dp_n 2} e^{\left(-\frac{n}{dp_n}\right)} \quad (6)$$

where dW/dlog(MW) is the differential weight fraction of polymer with a chain length n (n=MW/28 where 28 is the molecular weight of the polymer segment corresponding to a $C_2H_4$ unit) and $dp_n$ is the degree of polymerization.

Assuming a Flory-Schultz model, different moments of molecular weight distribution can be calculated using the following:

$$\mu_i = \int_0^\infty n^i W(n)dn$$

thus, $$\mu_0 = 1,$$

$$\mu_1 = dp_n, \text{ and}$$

$$\mu_2 = 2dp_n^2;$$

so, $$M_n = Mw_{monomer}\frac{\mu_1}{\mu_0} = Mw_{monomer}dp_n$$

$$M_w = Mw_{monomer} = \frac{\mu_2}{\mu_1} = 2Mw_{monomer}dp_n$$

where $Mw_{monomer}$ is the molecular weight of the polymer segment corresponding to a $C_2H_4$ unit of monomer.

Alternatively, when a Ziegler-Natta catalyst is employed, the molecular weight distribution of the polymer made in a given reactor by a Ziegler-Natta catalyst, can be modeled as above but using the sum of four such single site catalyst sites, each of which is assumed to have a Flory-Schultz distribution. When considering the kinetics of the process model for a Zielger-Natta catalyst, the total amount of the Ziegler-Natta catalyst components fed to a reactor are known, and it is assumed that there is the same weight fraction of each of the four active catalyst sites modeled, but where each site has its own kinetics.

Finally, when a single site catalyst produces long chain branching, the molecular weight distribution is determined for the polymer using the following relationships (see "Polyolefins with Long Chain Branches Made with Single-Site Coordination Catalysts: A Review of Mathematical Modeling Techniques for Polymer Microstructure" by J. B. P Soares in *Macromolecular Materials and Engineering*, volume 289, Issue 1, Pages 70-87, Wiley-VCH, 2004 and "Polyolefin Reaction Engineering" by J. B. P Soares and T. F. L. McKenna Wiley-VCH, 2012).

$$w(n) = \frac{(1-\alpha)\tau_B e^{-\tau_B n}}{(1+\alpha)} I_1\left(2\frac{\tau_B n\sqrt{\alpha}}{1+\alpha}\right)$$

where n is the number of monomer units in a polymer chain, w(n) is the weight fraction of polymer chains having a chain length n, and $\tau_B$ and $\alpha$ are calculated using equations below:

$$\tau_B = \frac{1}{dp_n^B} = \frac{R_t + R_{LCB}}{R_p}$$

$$\alpha = \frac{R_{LCB}}{R_t}$$

where $$dp_n^B$$

is degree of polymerization, $R_p$ is the rate propagation, $R_t$ is the rate of termination and $R_{LCB}$ is the rate of long chain branching formation calculated using equation below:

$$R_{LCB} = k_{p13}\phi_1[m_3]$$

where $k_{p13}$ is the propagation rate constant for adding monomer 3 (macromonomer which is formed in the reactor) to a growing polymer chain ending with monomer 1, $[m_3]$ is the molar concentration of macromonomer in the reactor.

The weight distribution can be transformed into the common log scaled GPC trace by applying:

$$\frac{dW}{d\log(M)} = \ln(10)\frac{(1-\alpha)\tau_B e^{-\tau_B n}}{(1+\alpha)\sqrt{\alpha}} I_1\left(2\frac{\tau_B n\sqrt{\alpha}}{1+\alpha}\right) \quad (7)$$

where dw/dlog(MW) is the differential weight fraction of polymer with a chain length n (n=MW/28 where 28 is the molecular weight of the polymer segment corresponding to a $C_2H_4$ unit).

From the weight distribution, different moments of molecular weight distribution can be calculated using the following:

$$M_n = Mw_{monomer} dp_n^B \frac{1+\alpha}{1-\alpha}$$

$$M_w = 2Mw_{monomer} dp_n^B \frac{1+\alpha}{(1-\alpha)^2}$$

$$M_z = 3Mw_{monomer} dp_n^B \exp\left(\frac{3.36885\alpha - 3.14347\alpha^2}{1 - 1.3502\alpha + 0.368267\alpha^2}\right)$$

where $$dp_n^B$$

is degree of polymerization, and $\alpha$ is calculated as above.

Branch Frequency

The short chain branch frequency of the second ethylene copolymer (SCB2/1000carbon) is calculated based on kinetic equations and co-monomer consumption using the following equation:

$$BF = \frac{R_{BF}}{R_p} = \left(\frac{SCB2}{1000C}\right)$$

where $R_{BF}$ is the rate of short chain branching formation calculated using the equation:

$$R_{BF} = k_{p21}\phi_2[m_1] + k_{p22}\phi_2[m_2] + k_{tm12}\phi_1[m_2] + k_{tm22}\phi_2[m_2]$$

The short chain branch frequency of the first ethylene copolymer is estimated using the following equation:

$$SCB_1 = (SCB - w_2 SCB_2)/w_1$$

where the $SCB_1$, $SCB_2$ and SCB are the short chain branches per 1000 carbons of the first ethylene copolymer, the second ethylene copolymer (as determined above) and the overall experimentally determined short chain branching frequency for the polyethylene composition (i.e. as determined by FTIR analysis) respectively, and where $w_1$ and $w_2$ represent the respective weight fractions of the first and second ethylene copolymer components.

Melt Index ($I_7$)

The melt index, $I_2$ of each of the first and second ethylene copolymers is calculated based on the equation below:

$$\log_{10}(\text{Melt Index } I_2) = 7.8998042 - 3.9089344\left[\log_{10}\left(\frac{M_w}{1000}\right)\right] - 0.27994391\left(\frac{M_w}{M_n}\right)^{-1}$$

Density

The density of the second ethylene copolymer made in R2 is calculated using the equation below, and using as inputs the estimated SCB2, Mn and $M_w$ for the second ethylene copolymer:

$$\rho_2 = 1.77614 - 1.26705\times10^{-2}\left(\frac{SCB2}{1000C}\right)^{0.45} - 0.453492[\log_{10}(M_n)]^{0.45} + 3.51512\times10^{-5}[\log_{10}(M_n)]^5 + 9.27252\times10^{-5}[\log_{10}(M_w)]^3 - 6.3914\times10^{-5}\left(\frac{M_w}{M_n}\right)^{2.5} + 7.42869\times10^{-5}\left(\frac{M_z}{M_w}\right)^3$$

The density of the first ethylene copolymer made in R1, then is estimated using the following equation:

$$\rho_1 = (\rho - w_2\rho_2)/w_1$$

where $\rho_1$, $\rho_2$ and $\rho$ are the density of the first ethylene copolymer, the density of the second ethylene copolymer (found as above) and the experimentally determined overall density of the polyethylene composition (i.e. determined accordingly to ASTM D792-13) respectively, and where $w_1$ and $w_2$ represent the respective weight fractions of the first and second ethylene copolymer components.

TABLE 3

| Polyethylene Composition Component Properties | | | |
|---|---|---|---|
| Example No. | Example 1 (Inventive) | Example 2 (Inventive) | Example 3 (Inventive) |
| The First Ethylene Copolymer | | | |
| Catalyst System | SSC (metallocene) | SSC (metallocene) | SSC (metallocene) |
| Weight Fraction (%) | 27.3 | 27.2 | 27.6 |
| $M_n$ | 119566 | 82831 | 135246 |
| $M_w$ | 261078 | 178826 | 293264 |
| $M_z$ | 407399 | 277517 | 456215 |
| Polydispersity Index ($M_w/M_n$) | 2.18 | 2.16 | 2.17 |
| Branch Freq/1000 C (SCB1) | 3.53 | 5.73 | 3.04 |
| Density Estimate (g/cm$^3$) | 0.9461 | 0.9372 | 0.9424 |
| Melt Index, $I_2$ Estimate (g/10 min) | 0.021 | 0.092 | 0.013 |
| The Second Ethylene Copolymer | | | |
| Catalyst System | Ziegler Natta | Ziegler Natta | Ziegler Natta |
| Weight Fraction (%) | 72.66 | 72.83 | 72.45 |
| $M_n$ | 14321 | 16158 | 15959 |
| $M_w$ | 33234 | 39988 | 39414 |
| $M_z$ | 60374 | 77285 | 76406 |
| Polydispersity Index ($M_w/M_n$) | 2.32 | 2.47 | 2.47 |
| Branch Freq/1000 C (SCB2) | 1.70 | 2.12 | 2.02 |
| Density Estimate (g/cm$^3$) | 0.9512 | 0.9479 | 0.9485 |
| Melt Index, $I_2$ Estimate (g/10 min) | 67.83 | 33.48 | 35.41 |
| SCB1 /SCB 2 | 2.08 | 2.70 | 1.50 |

FIG. 1 shows that the polyethylene compositions of the present disclosure (Inv. Examples 1-3) as well as a comparative polyethylene composition (Comp. Example 4) have a bimodal GPC profile.

Figure 2:
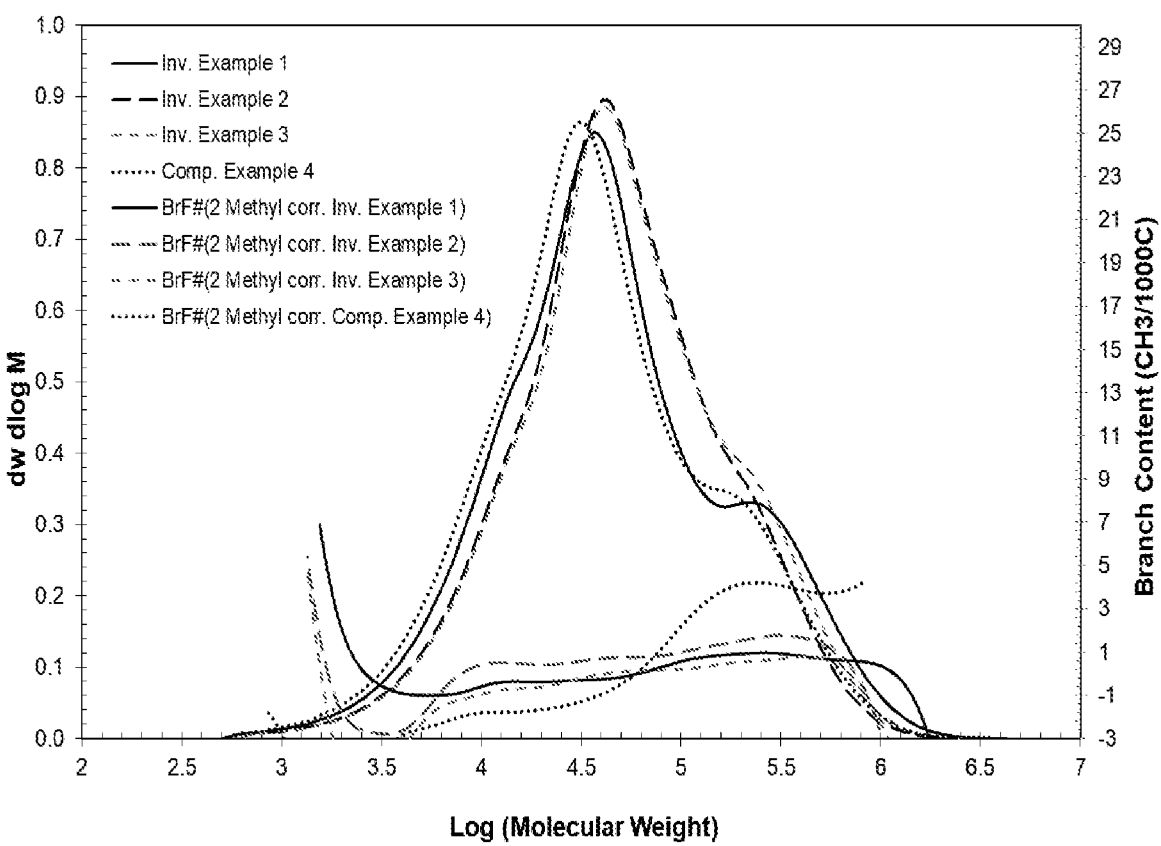
FIG. 2 shows the gel permeation chromatograph with Fourier transform infra-red (GPC-FTIR) detection obtained for polyethylene compositions made according to the present disclosure as well as for a comparative resin. The comonomer content, shown as the number of short chain branches per 1000 backbone carbons (y-axis), is given relative to the copolymer molecular weight (x-axis).

FIG. 2 shows the polyethylene compositions of the present disclosure (Inv. Example 1-3) have a bimodal GPC profile and have a relatively constant or slightly increasing amount of comonomer as the molecular weight increases (as indicated by the short chain branching content, SCB/1000 backbone carbons atoms). FIG. 2 also shows that the comparative resin, Comp. Example 4, has a bimodal GPC profile and a comonomer content which is increasing significantly as the molecular weight increases.

Figure 3:
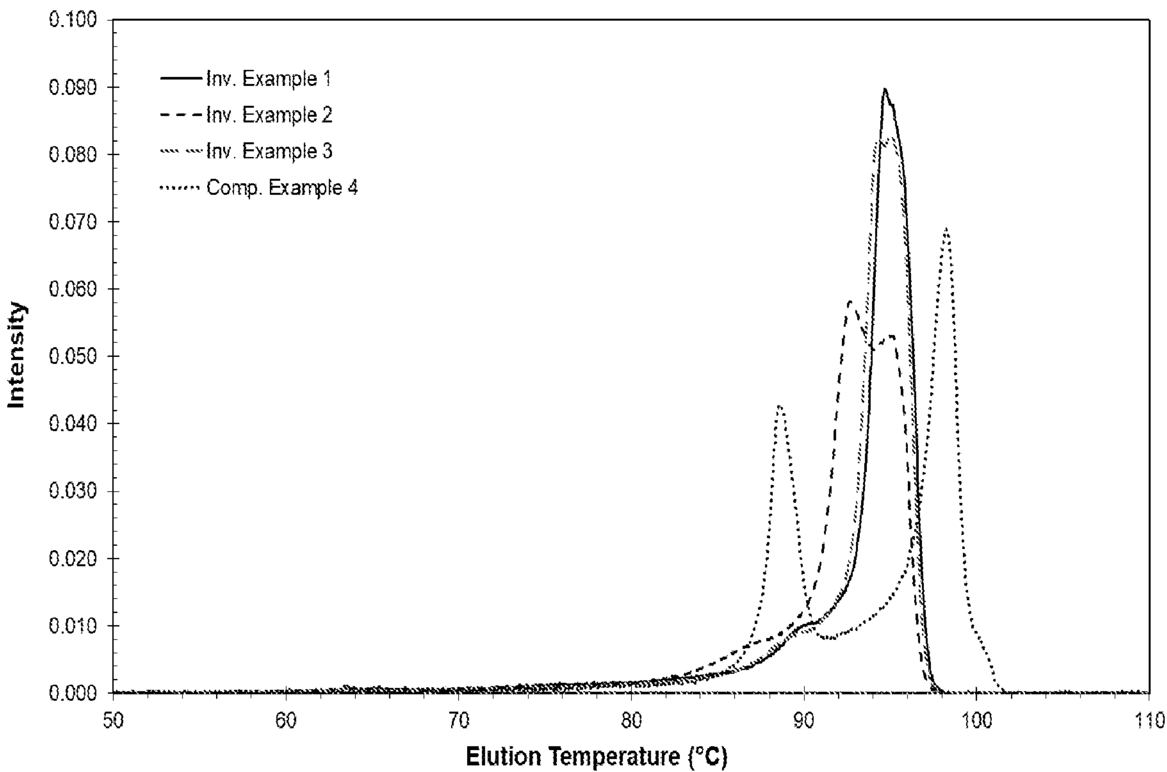
FIG. 3 shows the temperature rising elution fractionation (CTREF) profile for polyethylene compositions made according to the present disclosure as well as for a comparative resin.

FIG. 3 shows that the polyethylene compositions of the present disclosure (Inv. Example 1-3) have more than 70 weight percent of material eluting at a temperature of more than 90° C. in a CTREF analysis. Indeed, for the Inv. Examples 1-3, the CTREF profile shows that a large elution fraction having one or two peaks dominates the elution profile with more than 50 weight percent of the polymer material eluting at a temperature of from 90° C. to 98° C. In contrast, the CTREF profile obtained for Comp. Example 4, has two well separated, and distinct elution peaks with significant amounts of polymer material eluting at below 90° C. The different CTREF profiles observed for the inventive polyethylene compositions (Inv. Examples 1-3) and the comparative polyethylene composition (Comp. Example 4) are consistent with the relatively flat (or uniform) and the relatively reverse comonomer distributions observed for the inventive and the comparative polyethylene compositions respectively.

Figure 4:
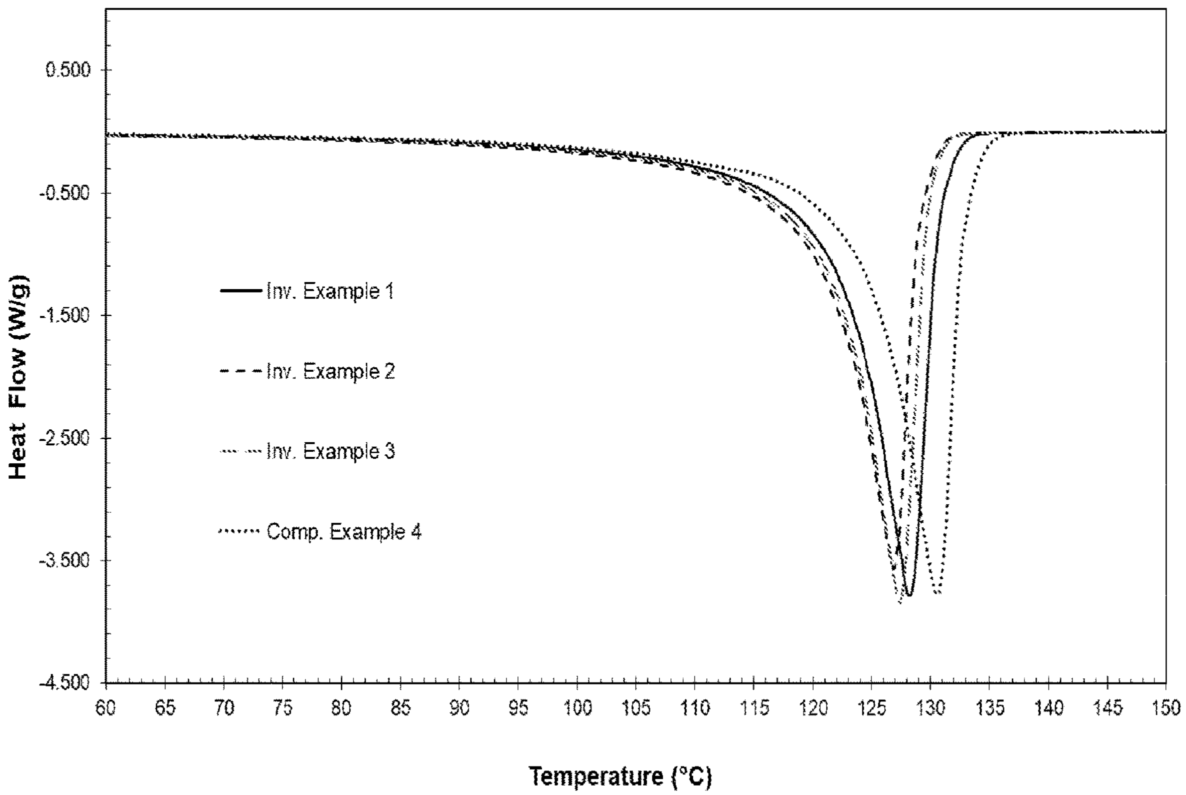
FIG. 4 shows the differential scanning calorimetry analysis (DSC) and profile of polyethylene compositions made according to the present disclosure as well as for a comparative resin.

As shown in FIG. 4, the polyethylene compositions made according to the present disclosure (Inventive Examples 1-3) have a slightly lower melting point temperature than that obtained for comparative polyethylene composition (Comp. Ex. 4). Without wishing to be bound by theory, a lower polymer melting point may be helpful during a biaxial stretching process to make BOPE film structures; the lower melting point indicates the presence of more amorphous material in the polyethylene composition which may help in softening sheet or film (made from the polymer composition) earlier during the stretching (i.e. during MD and/or TD orientation) process, thus improving the stretching process conditions window.

Figure 5:
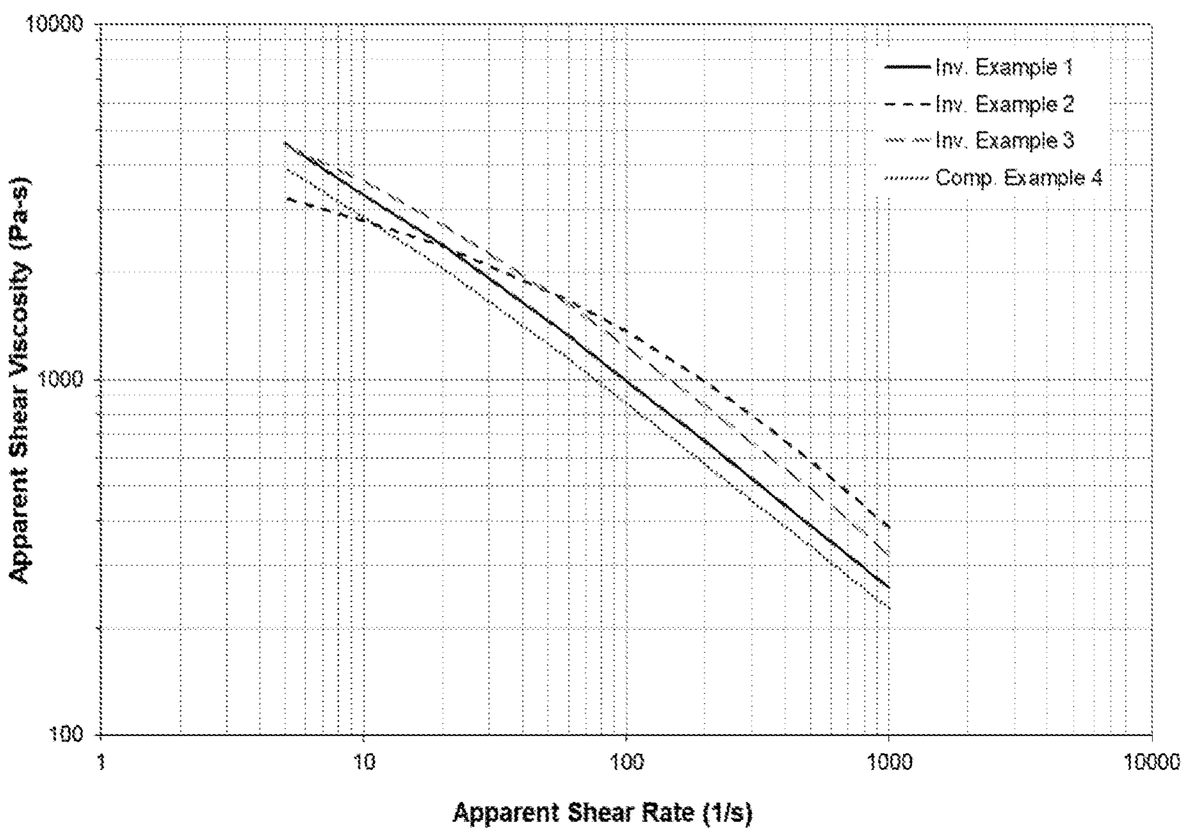
FIG. 5 shows the apparent shear viscosity (in Pa·s) vs. the apparent shear rate (in s$^{-1}$) as obtained by capillary rheology for polyethylene compositions made according to the present disclosure as well as for a comparative resin.

FIG. 5 indicates that the polyethylene compositions made according to the present disclosure, Inventive Examples 1-3, have good apparent shear viscosities and have good shear thinning behavior (e.g. the apparent shear viscosity decreases with increasing shear or deformation rates). Without wishing to be bound by theory, the good shear thinning behavior can provide high production rates during an extrusion process to make BOPE film in a tenter frame process.

A. Preparation of Unstretched Film (or "Base Film")

A mono-layer sheet is extruded at a rate of 20 kg/hr through a 270 mm wide cast die fitted with a 1.5 mm die gap. The sheet is casted onto a chill roll. An air knife and edge pinners are used to pin the sheet to the cast roll. The target sheet gauge was 700 microns. For convenience, this unstretched monolayer sheet is sometimes referred to herein as a "base film".

Monolayer base films were prepared with Inventive Examples 1-3 and Comparative Example 4 using the conditions described above to produce a base film or sheet.

An attempt to make a biaxially oriented polyethylene (BOPE) film was then carried out for each of these base films using the procedures described below in Part B.

Part B. Preparation of BOPE Films—Simultaneous Stretching

Biaxially oriented polyethylene (BOPE) films were prepared in a laboratory (or pilot) scale biaxial stretching machine: a KARO 5.0 biaxial stretching unit from Brückner, Germany. The BOPE films were prepared from a sample square having dimensions of about 10 cm×10 cm, the sample square having been cut from the monolayer base film prepared by cast coextrusion as described above. After being preheated in an oven chamber to a set temperature) for 120 seconds, the base film sample was subjected to simultaneous biaxial stretching (i.e. in both the machine direction and the transverse direction) at a stretching rate of 100-300%/second. Once stretched, the BOPE film was removed from the clamping device and allowed to cool. The machine direction orientation (MDO) and the transverse direction orientation (TDO) was carried out at temperatures of from 120° C. to 125° C. and simultaneous stretching (or draw) ratios of from 5.5 to 8:1 were employed. The results are provided in Table 4.

Figure 6:
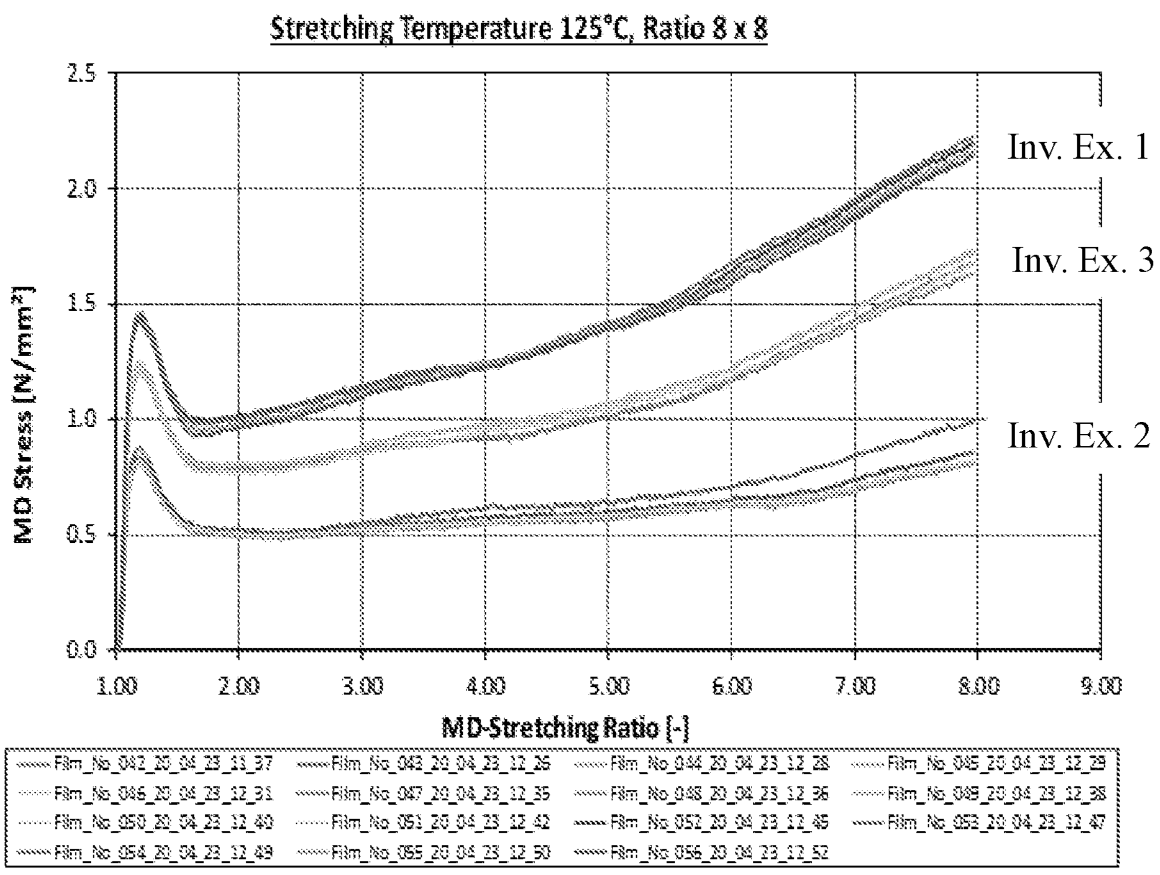
FIG. 6. The stress-strain behavior (in the rubbery state) of polyethylene compositions of the present disclosure, during stretching in the machine direction (MD) is shown in FIG. 6.
Figure 7:
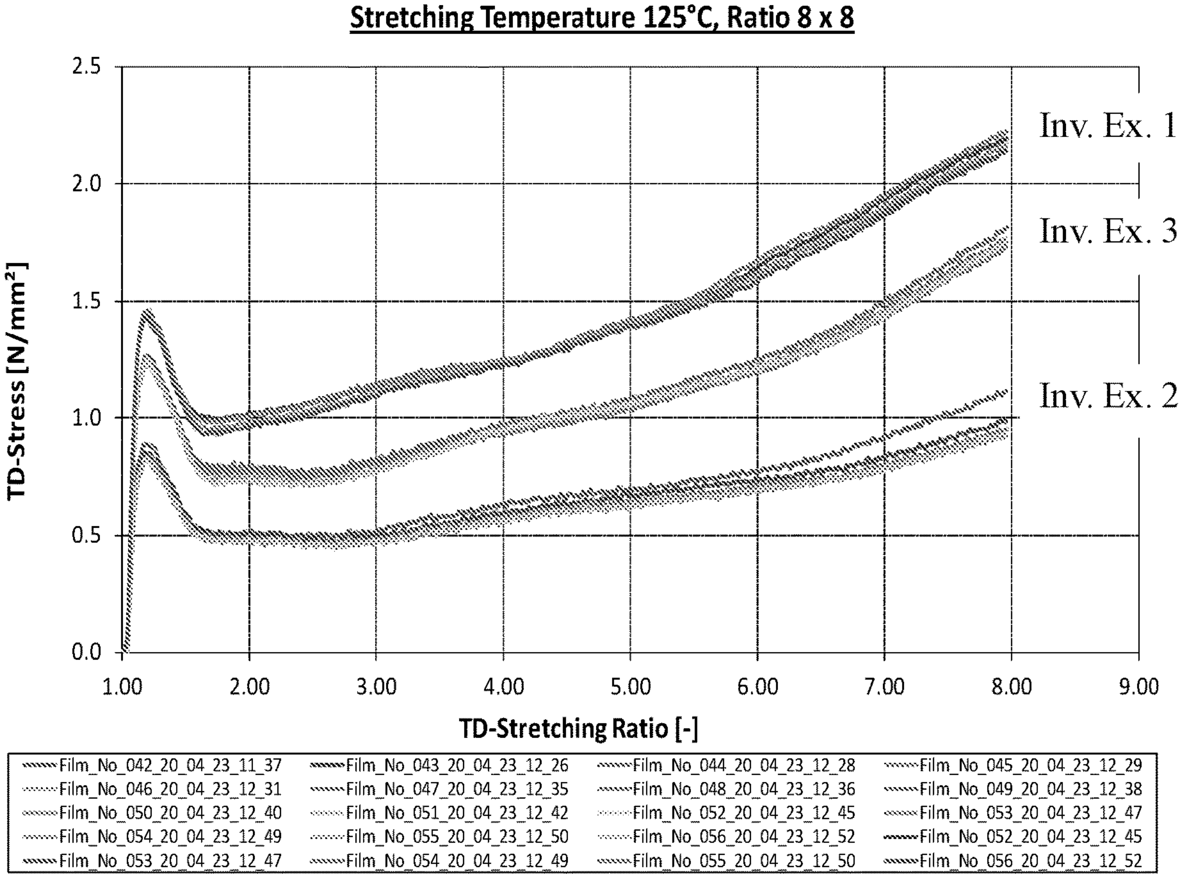
FIG. 7. The stress-strain behavior (in the rubbery state) of polyethylene compositions of the present disclosure during stretching in the machine direction (TD) is shown in FIG. 7.

If the base film could be successfully stretched using the KARO 5.0 biaxial stretcher from Bruckner, then the polyethylene composition which was used to prepare the film, is said herein to have "passed" the BOPE stretching process. More generally, a polyethylene composition is said to have "passed" in the BOPE stretching process if a) a film could be formed without tearing or forming holes, and b) if the material exhibited strain hardening characteristics in the tensile curve measuring forces during the orientation process. As shown in FIGS. 6 and 7, which show the changes in MD or TD stress in $N/mm^2$ with increasing MD or TD stretching ratio respectively, a polyethylene composition which "passed" the BOPE stretching process exhibited an initial rapid increase in stress, up to a yield point, followed by a less rapid increase in stress (strain softening behavior) and then a steady increase in stress forces (stain hardening behavior).

If the film could not be successfully stretched in one of, or both of the machine and transverse directions, if the film developed tears or other evident signs of breakage, or if the tested polyethylene composition exhibited little or no strain hardening behavior, then the polyethylene composition which was used to prepare the film, is said herein to have "failed" the BOPE stretching process.

TABLE 4

BOPE Film Production

| | Resin Example No. | | | |
|---|---|---|---|---|
| Base Film | Inv. Ex. 1 Monolayer | Inv. Ex. 2 Monolayer | Inv. Ex. 3 Monolayer | Comp. Ex. 4 Monolayer |
| 5.5 × 5.5 (MD × TD Stretch Ratio) at 120° C. | Pass | Pass | Pass | Fail |
| 6 × 6 (MD × TD Stretch Ratio) at 120° C. | Pass | Pass | Pass | Fail |
| 8 × 8 (MD × TD Stretch Ratio) at 125° C. | Pass | Pass | Pass | Fail |

TABLE 5

BOPE Film Properties

| Resin Used in the Film | Inv. Ex. 1 | Inv. Ex. 1 | Inv. Ex. 2 | Inv. Ex. 2 | Inv. Ex. 3 | Inv. Ex. 3 |
|---|---|---|---|---|---|---|
| MD Stretch Ratio × TD Stretch Ratio | 6 × 6 | 8 × 8 | 6 × 6 | 8 × 8 | 6 × 6 | 8 × 8 |
| Thickness (μm) | 15 | 7.34 | 15.75 | 8.38 | 16.63 | 9.16 |
| 1% Sec Modulus - MD (MPa) | 1251 | 1114 | 1392 | 1410 | 1482 | 1547 |
| 1% Sec Modulus - TD (MPa) | 1287 | 1008 | 1491 | 1438 | 1455 | 1548 |
| Tensile Break Str - MD (MPa) | 191 | 127 | 214 | 181 | 203 | 192 |
| Tensile Break Str - TD (MPa) | 178 | 114 | 213 | 180 | 187 | 197 |
| Elongation at Break - MD (%) | 109 | 97 | 110 | 82 | 99 | 79 |
| Elongation at Break - TD (%) | 129 | 113 | 137 | 103 | 119 | 93 |
| Haze (%) | 1.9 | 8.09 | 1.92 | 3.95 | 2.38 | 2.93 |
| Thermal Shrinkage MD (%) | 4.7 | 2.18 | 4.75 | 3 | 4.38 | 3 |
| Thermal Shrinkage TD (%) | 4.5 | 1.75 | 4.63 | 2.68 | 3.75 | 2.88 |

As the data in Table 4 shows, each of the polyethylene compositions prepared according to the present disclosure (Inv. Example 1-3) could be successfully made into BOPE film under a variety of MD and TD orientation ratios, while the comparative polyethylene composition (Comp. Example 4) could not. The data in Table 5, also shows that the BOPE films made from the polyethylene compositions of the present disclosure (Inv. Example 1-3) have good optical properties, with haze values of less than about 10 percent.

A person skilled in the art will recognize from the data provided in Tables 2 and 3 that the inventive polyethylene compositions (Inv. Examples 1-3) which are of high density (e.g. greater than about 0.940 g/cm$^3$) also have: i) significant amounts of long chain branching present (e.g. a LCBF>0.0100); ii) a relatively constant comonomer content with increasing molecular weight (e.g. the ratio of SCB1/SCB32 is greater than about 1.0, but less than about 3.0); iii) a relatively broad molecular weight distribution (e.g. the Mw/Mn is greater than about 3.5); iv) a relatively high melt flow ratio (e.g. an $I_{21}/I_2$ of greater than about 40); and v) a relatively large amount of polymer material eluting in a CTREF analysis at above about 90° C.

In view of the data provided in Tables 2-5, a person skilled in the art will recognize that the polyethylene compositions of the present disclosure are suitable for use in a process to make BOPE films and multilayer BOPE film structures.

Non-limiting embodiments of the present disclosure include the following:

Embodiment A. A polyethylene composition comprising:
- (i) from 5 to 50 weight % of first ethylene copolymer having a weight average molecular weight, Mw of from 170,000 g/mol to 470,000 g/mol; and
- (ii) from 95 to 50 weight % of a second ethylene copolymer;
- wherein the first ethylene copolymer has a higher weight average molecular weight, Mw than the second ethylene copolymer;
- wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.5;
- wherein the polyethylene composition has a density of from 0.941 to 0.962 g/cm$^3$; a melt index, $I_2$ of from 0.5 to 5.0 g/10 min; a melt flow ratio, $I_{21}/I_2$ of ≥40; a Z-average molecular weight distribution, Mz/Mw of ≥2.5; a comonomer distribution breadth index, $CDBI_{50}$ of >50 wt %; a long chain branching factor, LCBF of >0.0010;
- wherein in a temperature rising elution fractionation (CTREF) analysis, the polyethylene composition has greater than 70 weight percent of material eluting at a temperature of greater than 90° C.

Embodiment B. The polyethylene composition of Embodiment A wherein in a temperature rising elution fractionation (CTREF) analysis, the polyethylene composition has greater than 50 weight percent of material eluting at a temperature of from 90 to 98° C.

Embodiment C. The polyethylene composition of Embodiment A or B having a molecular weight distribution, Mw/Mn of from 3.5 to 6.5.

Embodiment D. The polyethylene composition of Embodiment A, B, or C having a Z-average molecular weight, Mz of ≥250,000 g/mol.

Embodiment E. The polyethylene composition of Embodiment A, B, C, or D having a comonomer distribution breadth index, $CDBI_{50}$ of >65 wt %.

Embodiment F. The polyethylene composition of Embodiment A, B, C, D, or E wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.0.

Embodiment G. The polyethylene composition of Embodiment A, B, C, D, or E, wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 1.0 to 3.0.

Embodiment H. The polyethylene composition of Embodiment A, B, C, D, E, F or G wherein the first ethylene copolymer has <7.5 short chain branches per 1000 carbon atoms (SCB1/1000 Cs).

Embodiment I. The polyethylene composition of Embodiment A, B, C, D, E, F, G or H wherein the second ethylene copolymer has <3.0 short chain branches per 1000 carbon atoms (SCB2/1000 Cs).

Embodiment J. The polyethylene composition of Embodiment A, B, C, D, E, F, G, H or I wherein the first ethylene copolymer has a density of from 0.930 to 0.955 g/cm$^3$.

Embodiment K. The polyethylene composition of Embodiment A, B, C, D, E, F, G, H, I or J wherein the second ethylene copolymer has a density of from 0.935 to 0.960 g/cm$^3$.

Embodiment L. The polyethylene composition of Embodiment A, B, C, D, E, F, G, H, I, J, or K wherein the first ethylene copolymer has a melt index, $I_2$ of <0.5 g/10 min.

Embodiment M. The polyethylene composition of Embodiment A, B, C, D, E, F, G, H, I, J, K, or L wherein the second ethylene copolymer has a melt index, $I_2$ of >10.0 g/10 min.

Embodiment N. The polyethylene composition of Embodiment A, B, C, D, E, F, G, H, I, J, K, L or M wherein the first ethylene copolymer has a molecular weight distribution, Mw/Mn of from 1.7 to 2.3.

Embodiment O. The polyethylene composition of Embodiment A, B, C, D, E, F, G, H, I, J, K, L, M, or N wherein the second ethylene has a molecular weight distribution, Mw/Mn of ≥2.3.

Embodiment P. The polyethylene composition of Embodiment A, B, C, D, E, F, G, H, I, J, K, L, M, N, or O having a density of from 0.942 g/cm$^3$ to 0.954 g/cm$^3$.

Embodiment Q. The polyethylene composition of Embodiment A, B, C, D, E, F, G, H, I, J, K, L, M, N, O, or P having a melt index, $I_2$ of from 0.5 to 2.5 g/10 min.

Embodiment R. The polyethylene composition of Embodiment A, B, C, D, E, F, G, H, I, J, K, L, M, N, O, P, or Q having a melt flow ratio, $I_{21}/I_2$ of ≥45.

Embodiment S. The polyethylene composition of Embodiment A, B, C, D, E, F, G, H, I, J, K, L, M, N, O, P, or Q having a melt flow ratio, $I_{21}/I_2$ of from 45 to 100.

Embodiment T. The polyethylene composition of Embodiment A, B, C, D, E, F, G, H, I, J, K, L, M, N, O, P, Q, R, or S having a Z-average molecular weight distribution, Mz/Mw of from 2.5 to 4.5.

Embodiment U. The polyethylene composition of Embodiment A, B, C, D, E, F, G, H, I, J, K, L, M, N, O, P, Q, R, or S wherein the polyethylene composition has a Z-average molecular weight distribution, Mz/Mw of >2.8.

Embodiment V. The polyethylene composition of Embodiment A, B, C, D, E, F, G, H, I, J, K, L, M, N, O, P, Q, R, S, T, or U having a Z-average molecular weight of from 250,000 to 500,000 g/mol.

Embodiment W. The polyethylene composition of Embodiment A, B, C, D, E, F, G, H, I, J, K, L, M, N, O, P, Q, R, S, T, U, or V wherein the polyethylene composition has hafnium residues present in at least 0.05 ppm based on the weight of the polyethylene composition.

Embodiment X. The polyethylene composition of Embodiment A, B, C, D, E, F, G, H, I, J, K, L, M, N, O, P, Q, R, S, T, U, V, or W wherein the polyethylene composition has and a long chain branching factor, LCBF of >0.0050.

Embodiment Y. The polyethylene composition of Embodiment A, B, C, D, E, F, G, H, I, J, K, L, M, N, O, P, Q, R, S, T, U, V, or W wherein the polyethylene composition has and a long chain branching factor, LCBF of >0.0100.

Embodiment Z. The polyethylene composition of Embodiment A, B, C, D, E, F, G, H, I, J, K, L, M, N, O, P, Q, R, S, T, U, V, W, X, or Y wherein first ethylene copolymer is made with a single site catalyst.

Embodiment AA. The polyethylene composition of Embodiment A, B, C, D, E, F, G, H, I, J, K, L, M, N, O, P, Q, R, S, T, U, V, W, X, Y, or Z wherein the second ethylene copolymer made with a single site catalyst or a Ziegler-Natta catalyst.

Embodiment BB. A biaxially oriented polyethylene film comprising a polyethylene composition, the polyethylene composition comprising:

(i) from 5 to 50 weight % of first ethylene copolymer having a weight average molecular weight, Mw of from 170,000 g/mol to 470,000 g/mol; and (ii) from 95 to 50 weight % of a second ethylene copolymer;

wherein the first ethylene copolymer has a higher weight average molecular weight, Mw than the second ethylene copolymer;

wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.5;

wherein the polyethylene composition has a density of from 0.941 to 0.962 g/cm$^3$; a melt index, $I_2$ of from 0.5 to 5.0 g/10 min; a melt flow ratio, $I_{21}/I_2$ of ≥40; a Z-average molecular weight distribution, Mz/Mw of ≥2.5; a comonomer distribution breadth index, $CDBI_{50}$ of >50 wt %; a long chain branching factor, LCBF of >0.0010;

wherein in a temperature rising elution fractionation (CTREF) analysis, the polyethylene composition has greater than 70 weight percent of material eluting at a temperature of greater than 90° C.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising", "including", "containing", etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, compositions, or biological systems, which can of course vary. It is also to be understood that the terminology used herein is for describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to", "at least", "greater than", "less than" and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

INDUSTRIAL APPLICABILITY

The present disclosure is directed to polyethylene compositions which are useful in the formation of biaxially oriented films. The biaxially oriented polyethylene films can be used in a wide variety of packaging applications, including "all polyethylene packages" which may facilitate recycling.

The invention claimed is:

1. A polyethylene composition comprising:

(i) from 5 to 50 weight % of first ethylene copolymer having a weight average molecular weight, Mw of from 170,000 g/mol to 470,000 g/mol; and (ii) from 95 to 50 weight % of a second ethylene copolymer;

wherein the first ethylene copolymer has a higher weight average molecular weight, Mw than the second ethylene copolymer;

wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.5;

wherein the polyethylene composition has a density of from 0.941 to 0.962 g/cm$^3$; a melt index, $I_2$ of from 0.5 to 5.0 g/10 min; a melt flow ratio, $I_{21}/I_2$ of ≥40; a Z-average molecular weight distribution, Mz/Mw of ≥2.5; a comonomer distribution breadth index, $CDBI_{50}$ of >50 wt %; a long chain branching factor, LCBF of >0.0010; and wherein in a temperature rising elution fractionation (CTREF) analysis, the polyethylene composition has greater than 70 weight percent of material eluting at a temperature of greater than 90° C.

2. The polyethylene composition of claim 1, wherein in a temperature rising elution fractionation (CTREF) analysis, the polyethylene composition has greater than 50 weight percent of material eluting at a temperature of from 90 to 98° C.

3. The polyethylene composition of claim 1, having a molecular weight distribution, Mw/Mn of from 3.5 to 6.5.

4. The polyethylene composition of claim 1, having a Z-average molecular weight, Mz of ≥250,000 g/mol.

5. The polyethylene composition of claim 1, having a comonomer distribution breadth index, $CDBI_{50}$ of >65 wt %.

6. The polyethylene composition of claim 1, wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.0.

7. The polyethylene composition of claim 1, wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 1.0 to 3.0.

8. The polyethylene composition of claim 1, wherein the first ethylene copolymer has <7.5 short chain branches per 1000 carbon atoms (SCB1/1000Cs).

9. The polyethylene composition of claim 1, wherein the second ethylene copolymer has <3.0 short chain branches per 1000 carbon atoms (SCB2/1000Cs).

10. The polyethylene composition of claim 1, wherein the first ethylene copolymer has a density of from 0.930 to 0.955 g/cm$^3$.

11. The polyethylene composition of claim 1, wherein the second ethylene copolymer has a density of from 0.935 to 0.960 g/cm$^3$.

12. The polyethylene composition of claim 1, wherein the first ethylene copolymer has a melt index, $I_2$ of <0.5 g/10 min.

13. The polyethylene composition of claim 1, wherein the second ethylene copolymer has a melt index, $I_2$ of >10.0 g/10 min.

14. The polyethylene composition of claim 1, wherein the first ethylene copolymer has a molecular weight distribution, Mw/Mn of from 1.7 to 2.3.

15. The polyethylene composition of claim 1, wherein the second ethylene has a molecular weight distribution, Mw/Mn of ≥2.3.

16. The polyethylene composition of claim 1, having a density of from 0.942 g/cm$^3$ to 0.954 g/cm$^3$.

17. The polyethylene composition of claim 1, having a melt index, $I_2$ of from 0.5 to 2.5 g/10 min.

18. The polyethylene composition of claim 1, having a melt flow ratio, $I_{21}/I_2$ of ≥45.

19. The polyethylene composition of claim 1, having a melt flow ratio, $I_{21}/I_2$ of from 45 to 100.

20. The polyethylene composition of claim 1, having a Z-average molecular weight distribution, Mz/Mw of from 2.5 to 4.5.

21. The polyethylene composition of claim 1, wherein the polyethylene composition has a Z-average molecular weight distribution, Mz/Mw of >2.8.

22. The polyethylene composition of claim 1, having a Z-average molecular weight of from 250,000 to 500,000 g/mol.

23. The polyethylene composition of claim 1, wherein the polyethylene composition has hafnium residues present in at least 0.05 ppm based on the weight of the polyethylene composition.

24. The polyethylene composition of claim 1, wherein the polyethylene composition has a long chain branching factor, LCBF of >0.0050.

25. The polyethylene composition of claim 1, wherein the polyethylene composition has a long chain branching factor, LCBF of >0.0100.

26. The polyethylene composition of claim 1, wherein first ethylene copolymer is made with a single site catalyst.

27. The polyethylene composition of claim 1, wherein the second ethylene copolymer made with a single site catalyst or a Ziegler-Natta catalyst.

28. A biaxially oriented polyethylene film comprising a polyethylene composition, the polyethylene composition comprising:

(i) from 5 to 50 weight % of first ethylene copolymer having a weight average molecular weight, Mw of from 170,000 g/mol to 470,000 g/mol; and (ii) from 95 to 50 weight % of a second ethylene copolymer;

wherein the first ethylene copolymer has a higher weight average molecular weight, Mw than the second ethylene copolymer;

wherein the ratio (SCB1/SCB2) of the number of short chain branches per thousand carbon atoms in said first ethylene copolymer (SCB1) to the number of short chain branches per thousand carbon atoms in said second ethylene copolymer (SCB2) is from 0.8 to 3.5;

wherein the polyethylene composition has a density of from 0.941 to 0.962 g/cm$^3$; a melt index, $I_2$ of from 0.5 to 5.0 g/10 min; a melt flow ratio, $I_{21}/I_2$ of ≥40; a Z-average molecular weight distribution, Mz/Mw of ≥2.5; a comonomer distribution breadth index, $CDBI_{50}$ of >50 wt %; a long chain branching factor, LCBF of >0.0010; and wherein in a temperature rising elution fractionation (CTREF) analysis, the polyethylene composition has greater than 70 weight percent of material eluting at a temperature of greater than 90° C.

* * * * *